US011327426B2

(12) United States Patent
Nakazawa et al.

(10) Patent No.: US 11,327,426 B2
(45) Date of Patent: May 10, 2022

(54) IMAGE FORMING DEVICE

(71) Applicant: Oki Data Corporation, Tokyo (JP)

(72) Inventors: Kazuo Nakazawa, Tokyo (JP);
Noriyasu Sakamoto, Tokyo (JP);
Hisashi Ishizuka, Tokyo (JP); Toru Mogi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 104 days.

(21) Appl. No.: 16/874,834

(22) Filed: May 15, 2020

(65) Prior Publication Data

US 2020/0379393 A1 Dec. 3, 2020

(30) Foreign Application Priority Data

May 31, 2019 (JP) .............................. JP2019-101907

(51) Int. Cl.
*G03G 15/00* (2006.01)
*G03G 15/20* (2006.01)
*H02H 3/20* (2006.01)
*H02M 3/335* (2006.01)

(52) U.S. Cl.
CPC ......... *G03G 15/55* (2013.01); *G03G 15/2039* (2013.01); *H02H 3/20* (2013.01); *H02M 3/33523* (2013.01)

(58) Field of Classification Search
CPC ........... G03G 15/2039; G03G 15/5004; G03G 15/5016; G03G 15/55; G03G 15/80; H02H 11/00; H02H 1/06; H02H 3/20; H02M 1/0006; H02M 1/007; H02M 1/32; H02M 3/33523

See application file for complete search history.

(56) References Cited

U.S. PATENT DOCUMENTS

| | | | | |
|---|---|---|---|---|
| 2010/0189234 A1* | 7/2010 | Nakazawa | ......... | H04N 1/32728 379/100.01 |
| 2013/0088744 A1* | 4/2013 | Kodama | ............ | G03G 15/5004 358/1.14 |
| 2014/0356005 A1* | 12/2014 | Sakamoto | .......... | G03G 15/1675 399/45 |
| 2017/0235271 A1* | 8/2017 | Shiraishi | ................ | G03G 15/80 399/88 |

FOREIGN PATENT DOCUMENTS

JP 5187008 B2 4/2013
JP 2018173527 A * 11/2018

* cited by examiner

*Primary Examiner* — Francis C Gray
(74) *Attorney, Agent, or Firm* — Rabin & Berdo, P.C.

(57) ABSTRACT

An image forming device that forms an image on a medium, includes: a heater that heats the medium; a control unit that controls the heater; a first path that receives input voltage from an external power supply, converts the input voltage into desired voltage, and supplies the desired voltage to the control unit; a second path that divides the input voltage received by the first path and supplies the input voltage to the heater; a control element that is connected to the second path and controls ON/OFF switching of the heater according to control from the control unit; and a disconnection unit that disconnects the second path depending on condition of the input voltage.

17 Claims, 25 Drawing Sheets

# IMAGE FORMING DEVICE

TECHNICAL FIELD

The present invention relates to an image forming device.

BACKGROUND ART

In order to prevent an input device and a power supply from being broken by abnormal input voltage inputted to the input device, providing the input device with a protective circuit is a conventionally used method.

Patent Reference 1 describes a protective circuit that detects the type (AC: Alternating Current or DC: Direct Current) of supply power inputted to a device, determines whether to interrupt the input voltage or not based on the result of the detection, and interrupts the input voltage by forcibly making a fuse operate when the supply power is judged to be DC power.

PRIOR ART REFERENCE

Patent Reference

Patent Reference 1: Japanese Patent No. 5187008

SUMMARY OF THE INVENTION

Problem to be Solved by the Invention

In the conventional technology, however, the protective circuit is provided in an input part of the device, and thus if such a protective circuit is provided in an image forming device, for example, input voltage to the image forming device is totally disconnected from the device when the protective circuit detects DC power and activates the protective operation. When the input voltage to the image forming device is totally disconnected, the image forming device is supplied with no voltage and thus stops operating.

Therefore, the user cannot know what event caused the stoppage of the operation of the image forming device or what event caused the protective circuit to operate. Further, it is necessary to perform maintenance work since the fuse as the protective circuit necessarily blows when DC power is detected.

It is therefore an object of the present invention to make it possible to disconnect only a path for supplying voltage from a power supply to a heater without disconnecting a path for supplying voltage to other parts, depending on the condition of the voltage.

Means for Solving the Problem

An image forming device that forms an image on a medium, includes: a heater that heats the medium; a control unit that controls the heater; a first path that receives input voltage from an external power supply, converts the input voltage into desired voltage, and supplies the desired voltage to the control unit; a second path that divides the input voltage received by the first path and supplies the input voltage to the heater; a control element that is connected to the second path and controls ON/OFF switching of the heater according to control from the control unit; and a disconnection unit that disconnects the second path depending on condition of the input voltage.

Effect of the Invention

According to one or more aspects of the present invention, it is possible to disconnect the path for supplying voltage from the power supply to the heater without disconnecting the path for supplying voltage to other parts, depending on the condition of the voltage.

DETAILED DESCRIPTION OF THE INVENTION

First Embodiment

Figure 1:
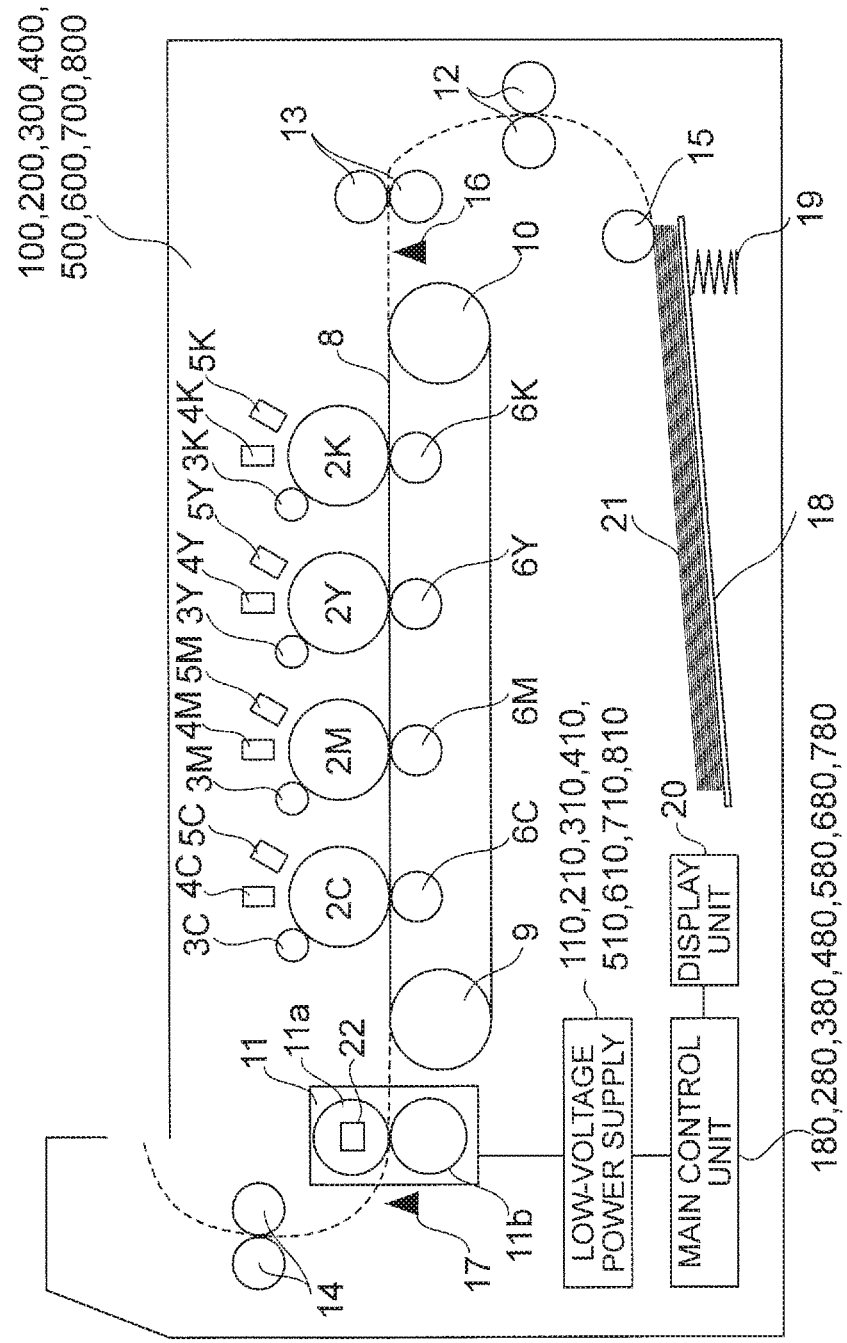
FIG. 1 is a vertical sectional view schematically showing the configuration of image forming devices according to first to eights embodiments.

FIG. 1 is a vertical sectional view schematically showing the configuration of an image forming device 100 according to a first embodiment.

The image forming device 100 according to the first embodiment is an example of a color image forming device that obtains a color image by performing the printing in which toners as developing agents of four colors: black, yellow, magenta and cyan are overlaid, but the image forming device 100 is not limited to such an example and can also be a monochrome image forming device using only one color of black or a color image forming device using different colors.

As shown in the drawing, the image forming device 100 includes photosensitive drums 2K, 2Y, 2M and 2C, chargers 3K, 3Y, 3M and 3C, exposure units 4K, 4Y, 4M and 4C, and developing units 5K, 5Y, 5M and 5C.

Further, the image forming device 100 includes transfer rollers 6K, 6Y, 6M and 6C, a transfer belt 8, a drive roller 9, an idle roller 10, a fixation device 11, first conveyance rollers 12, second conveyance rollers 13, ejection rollers 14, a hopping roller 15, a write start sensor 16, an ejection sensor 17, a support plate member 18, a spring 19 and a display unit 20.

Furthermore, the image forming device 100 includes a low-voltage power supply 110 and a main control unit 180. In the following description, the main control unit 180 will also be referred to as simply a "control unit". Further, the low-voltage power supply 110 will also be referred to as a "power supply unit".

In FIG. 1, the capital letter "K" represents black, the capital letter "Y" represents yellow, the capital letter "M" represents magenta, and the capital letter "C" represents cyan.

Incidentally, when discriminating among these colors is not particularly necessary in a subsequent description, the description will be given while omitting those capital letters.

The photosensitive drum 2 bears an image to be transferred. Here, the image to be transferred is a toner image as an image formed with a developing agent.

The charger 3 charges a corresponding photosensitive drum 2 with negative electric charge.

The exposure unit 4 draws a latent image on the corresponding photosensitive drum 2.

The developing unit 5 visualizes the latent image on the corresponding photosensitive drum 2 with a negatively charged toner as the developing agent.

The transfer roller 6 is arranged on an inner side of the transfer belt 8 formed as an endless belt, and is pressed against the corresponding photosensitive drum 2 across the transfer belt 8 by an elastic member such as a spring.

The transfer belt 8 is supported by outer circumferential surfaces of the drive roller 9 and the idle roller 10. Further, the transfer belt 8 is stretched between the drive roller 9 and the idle roller 10 so that a surface on which the transfer belt 8 and the photosensitive drums 2 contact each other can become flat.

The drive roller 9 is connected to a non-illustrated driving device so as to rotate around an axis.

When the transfer belt 8 moves in conjunction with the rotation of the drive roller 9, the idle roller 10 rotates in the same rotating direction as the drive roller 9 in conjunction with the movement of the transfer belt 8.

The fixation device 11, including a fixation roller 11a having a heater 22 inside as a heat source and a backup roller 11b biased by a biasing means towards the fixation roller 11a, fixes the toner image transferred onto a record medium 21 by using heat and pressure. The heater 22 is used for heating the medium on which the toner image has been formed.

The broken line in FIG. 1 indicates a conveyance path of the record medium 21, along which the first conveyance rollers 12, the second conveyance rollers 13 and the write start sensor 16 are arranged on an upstream side of the transfer belt 8, and the ejection sensor 17 and the ejection rollers 14 are arranged on a downstream side of the fixation device 11.

When the record medium 21 conveyed along the conveyance path arrives, each of the write start sensor 16 and the ejection sensor 17 detects a prescribed position (in this example, the write start sensor 16 detects a front end position and the ejection sensor 17 detects a rear end position) of the record medium 21 and supplies a detection signal to the main control unit 180.

The record media 21 are set on a top surface of the support plate member 18. The spring 19 as a biasing member for pushing the support plate member 18 upward is provided under the support plate member 18. The record media 21 set on the top surface of the support plate member 18 are pressed against the hopping roller 15 by the biasing force of the spring 19, and a record medium 21 is pushed into the conveyance path by the rotation of the hopping roller 15 in the direction of pushing into the conveyance path.

Incidentally, the photosensitive drums 2, the hopping roller 15, the first conveyance rollers 12, the second conveyance rollers 13, the drive roller 9, the fixation device 11 (the fixation roller 11a and the backup roller 11b) and the ejection rollers 14 are connected to a driving device (not shown) including motors, and the driving device is controlled by the main control unit 180. Incidentally, the main control unit 180 also performs control of the heater 22.

Figure 2:
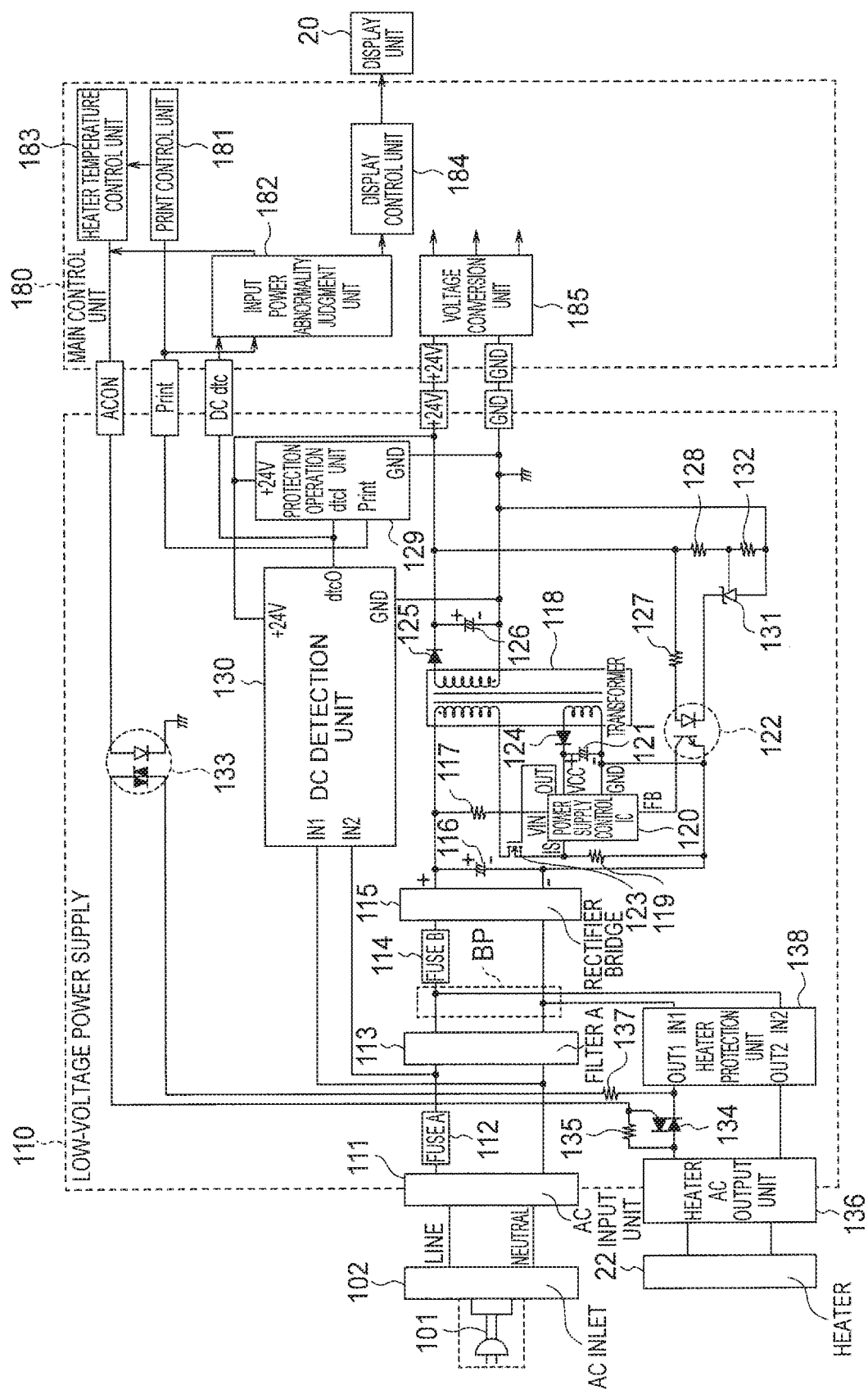
FIG. 2 is a block diagram showing the schematic configuration of a low-voltage power supply and a main control unit in the image forming device according to the first embodiment.

FIG. 2 is a block diagram showing the schematic configuration of the low-voltage power supply 110 and the main control unit 180 in the image forming device 100 according to the first embodiment.

FIG. 2 indicates parts relevant to features of the first embodiment, which are extracted from the low-voltage power supply 110 and the main control unit 180.

A power cord 101 is connected to a commercial power supply (AC power supply) used as an external power supply. The power cord 101 is connected to an AC inlet 102, and the AC inlet 102 is connected to an AC input unit 111 of the low-voltage power supply 110.

A LINE side of the AC input unit 111 is connected to a fuse A 112. The fuse A 112 is connected to a filter A 113 and an IN2 pin of a DC detection unit 130.

A NEUTRAL side of the AC input unit 111 is connected to the filter A 113 and an IN1 pin of the DC detection unit 130.

The filter A 113 is connected to a fuse B 114 and an IN2 pin of a heater protection unit 138.

Further, the filter A 113 is connected to the input side of a rectifier bridge 115 and an IN1 pin of the heater protection unit 138.

The fuse B 114 is connected to the input side of the rectifier bridge 115.

A + terminal on the output side of the rectifier bridge 115 is connected to a + terminal of an electrolytic capacitor 116, a resistor 117, and the primary side of a transformer 118.

A − terminal on the output side of the rectifier bridge 115 is connected to a − terminal of the electrolytic capacitor 116, a resistor 119, a GND pin of a power supply control IC 120, a − terminal of an electrolytic capacitor 121, a third winding of the transformer 118, and the emitter of a photocoupler 122.

The resistor 117 is connected to a VIN pin of the power supply control IC 120.

The drain of an FET 123 is connected to the primary side of the transformer 118, the source of the FET 123 is connected to the resistor 119 and an IS pin of the power supply control IC 120, and the gate of the FET 123 is connected to an OUT pin of the power supply control IC 120.

The transformer 118 includes a first winding on the primary side, a second winding on the secondary side, and the third winding as an auxiliary winding used for controlling the primary side.

The third winding's side of the transformer 118 is connected with the anode of a diode 124, and the cathode of the diode 124 is connected to the + terminal of the electrolytic capacitor 121 and a VCC pin of the power supply control IC 120.

The collector of the photocoupler 122 is connected to an FB pin of the power supply control IC 120.

The secondary side of the transformer 118 is connected to the anode of a diode 125, and the cathode of the diode 125 is connected to the + terminal of an electrolytic capacitor 126, a resistor 127, a resistor 128, a +24 V pin of a protection operation unit 129, a +24 V pin of the DC detection unit 130, and a +24 V output pin of the low-voltage power supply 110.

The secondary side of the transformer 118 is connected to the anode of a variable shunt regulator 131, the − terminal of the electrolytic capacitor 126, a resistor 132, a GND pin of the protection operation unit 129, a GND pin of the DC detection unit 130, and the cathode of a phototriac 133.

The anode of the photocoupler 122 is connected to the resistor 127.

The cathode of the photocoupler 122 is connected to the cathode of the variable shunt regulator 131.

A reference pin of the variable shunt regulator 131 is connected to the resistor 128 and the resistor 132.

The phototriac 133 is connected to a gate of a triac 134 and a resistor 135.

The resistor 135 is connected to the triac 134 and a heater AC output unit 136.

The triac 134 is connected to a resistor 137 and an OUT1 pin of the heater protection unit 138.

Further, the triac 134 is connected to the resistor 135 and the heater AC output unit 136.

Here, the triac 134 is a control element that controls ON/OFF switching of the heater 22 according to a command from the main control unit 180.

The phototriac 133 is connected to the resistor 137.

An OUT2 pin of the heater protection unit 138 is connected to the heater AC output unit 136.

A Print pin of the protection operation unit 129 is connected via a Print connector to a print control unit 181 in the main control unit 180 and to an input power abnormality judgment unit 182 of the main control unit 180.

The print control unit 181 switches the state of the heater 22 between an operating state and a non-operating state. The operating state is a state in which the triac 134 is capable of switching the heater 22 to on or off, and the non-operating state is a state in which the triac 134 is incapable of switching the heater 22, that is, a state in which the triac 134 is incapable of turning on the heater 22. Specifically, a signal outputted from the Print connector indicates the operating state when the signal is at an H level, and indicates the non-operating state when the signal is at an L level. In the following description, the operating state means that a print operation is in progress, and the non-operating state means that the print operation is not in progress.

The output of the input power abnormality judgment unit 182 is inputted to a heater temperature control unit 183 and a display control unit 184.

The display control unit 184 is connected to the display unit 20.

The +24 V output pin of the low-voltage power supply 110 is connected to a voltage conversion unit 185 via a +24 V input pin of the main control unit 180.

A GND output pin of the low-voltage power supply 110 is connected to the voltage conversion unit 185 via a GND input pin of the main control unit 180.

The voltage after undergoing the voltage conversion by the voltage conversion unit 185 in the main control unit 180 is supplied to circuits in the main control unit 180. While the voltage conversion unit 185 is provided in the main control unit 180 in the first embodiment, the first embodiment is not limited to such an example. For example, the voltage conversion unit 185 may be provided in the low-voltage power supply 110.

A dtcI pin of the protection operation unit 129 is connected to a dtcO pin of the DC detection unit 130, and to the input power abnormality judgment unit 182 via a DC dtc connector of the main control unit 180.

The anode of the phototriac 133 is connected to the heater temperature control unit 183 via an ACON connector of the main control unit 180.

Here, an electric wire connected to the IN2 pin of the heater protection unit 138 is connected to an electric wire between the filter A 113 and the fuse B 114, and an electric wire connected to the IN1 pin of the heater protection unit 138 is connected to an electric wire between the filter A 113 and the rectifier bridge 115. These connection points serve as branch points BP of electric wires.

Put another way, in the image forming device 100, voltage from the commercial power supply is inputted to the AC inlet 102, the input voltage as the voltage inputted to the AC inlet 102 is converted into desired voltage, and there are a first path supplying the desired voltage to the main control unit 180 and a second path branching off from the first path at the branch points BP and supplying the input voltage to the heater 22. The heater 22, the triac 134 and the heater protection unit 138 are connected in series in the second path.

Figure 3:
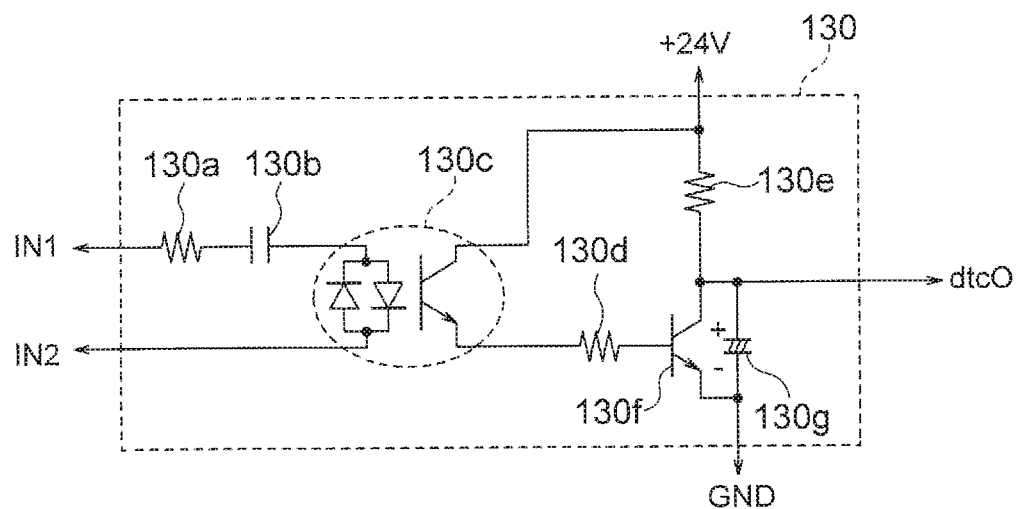
FIG. 3 is a circuit diagram showing an example of a direct current detection unit in the first embodiment.

FIG. 3 is a circuit diagram showing an example of the DC detection unit 130 in the first embodiment.

The DC detection unit 130 includes a resistor 130a, a capacitor 130b, a photocoupler 130c, a resistor 130d, a resistor 130e, a transistor 130f and an electrolytic capacitor 130g.

The resistor 130a is connected to the IN1 pin of the DC detection unit 130.

Further, the resistor 130a is connected to the capacitor 130b.

The capacitor 130b is connected to the photocoupler 130c.

The photocoupler 130c is connected to the IN2 pin of the DC detection unit 130.

Further, the collector of the photocoupler 130c is connected to the resistor 130e and the +24 V pin of the DC detection unit 130.

Furthermore, the emitter pin of the photocoupler 130c is connected to the resistor 130d.

The resistor 130d is connected to the base of the transistor 130f.

The emitter of the transistor 130f is connected to the GND pin of the DC detection unit 130 and the − terminal of the electrolytic capacitor 130g.

The collector of the transistor 130f is connected to the resistor 130e, the + terminal of the electrolytic capacitor 130g, and the dtcO pin of the DC detection unit 130.

Here, the DC detection unit 130 functions as an input abnormality detection unit that detects abnormality in the input voltage as the voltage inputted from the commercial power supply. The DC detection unit 130 detects abnormality when the input voltage is DC voltage.

Figure 4:
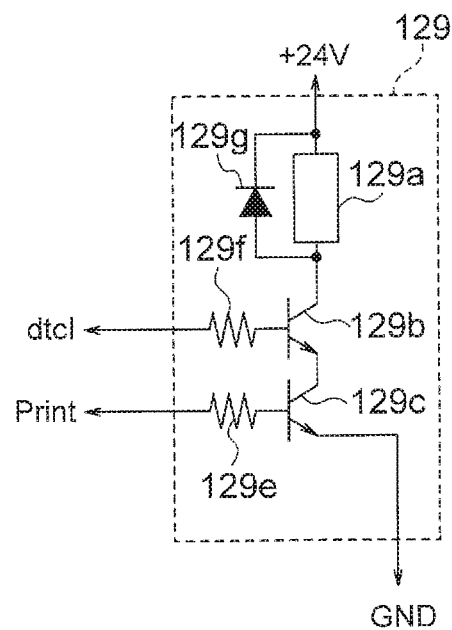
FIG. 4 is a circuit diagram showing an example of a protection operation unit in the first embodiment.

FIG. 4 is a circuit diagram showing an example of the protection operation unit 129 in the first embodiment.

The protection operation unit 129 includes a relay coil part 129a, a transistor 129b, a transistor 129c, a resistor 129e, a resistor 129f and a diode 129g.

The relay coil part 129a is connected to the cathode of the diode 129g and the +24 V pin of the protection operation unit 129.

Further, the relay coil part 129a is connected to the anode of the diode 129g and the collector of the transistor 129b.

The base of the transistor 129b is connected to the resistor 129f.

The resistor 129f is connected to the dtcI pin of the protection operation unit 129.

The Print pin of the protection operation unit 129 is connected to the resistor 129e.

The resistor 129e is connected to the base of the transistor 129c.

The collector of the transistor 129c is connected to the emitter of the transistor 129b.

The emitter of the transistor 129c is connected to the GND pin of the protection operation unit 129.

Figure 5:
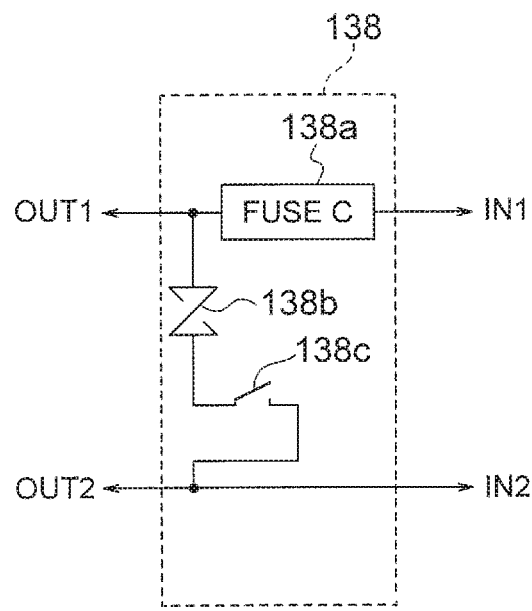
FIG. 5 is a circuit diagram showing an example of a heater protection unit in the first embodiment.

FIG. 5 is a circuit diagram showing an example of the heater protection unit 138 in the first embodiment.

The heater protection unit 138 includes a fuse C 138a, a varistor 138b and a relay contact part 138c.

The fuse C 138a is connected to the varistor 138b and the OUT1 pin of the heater protection unit 138.

Further, the fuse C 138a is connected to the IN1 pin of the heater protection unit 138.

The fuse C 138a functions as a disconnection unit for disconnecting the voltage supply path to the heater 22.

The varistor 138b is connected to the relay contact part 138c.

The relay contact part 138c is connected to the OUT2 pin and the IN2 pin of the heater protection unit 138.

A magnetic circuit is formed between the relay coil part 129a and the relay contact part 138c, and the relay coil part 129a and the relay contact part 138c function as an electromagnetic relay.

Here, a switching part for turning on or off the supply of electric current to the fuse C 138a is formed with the relay coil part 129a of the protection operation unit 129 and the relay contact part 138c of the heater protection unit 138. Incidentally, the configuration of the switching part is not limited to such an example; the switching part may be formed with a triac or the like, for example.

Figure 6A:
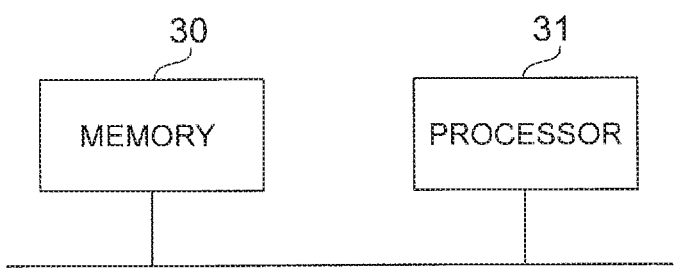
FIGS. 6A and 6B are block diagrams showing hardware configuration examples.

Part or all of the print control unit 181, the input power abnormality judgment unit 182, the heater temperature control unit 183 and the display control unit 184 of the main control unit 180 described above can be implemented by a memory 30 and a processor 31 such as a CPU (Central Processing Unit) for executing a program stored in the memory 30 as shown in FIG. 6A, for example. Such a program may be provided via a network, or provided in the form of being stored in a record medium. Namely, such a program may be provided as a program product, for example.

Figure 6B:
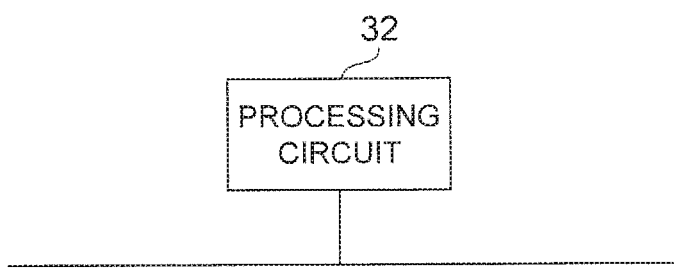

Part or the whole of the main control unit 180 is also implemented by a processing circuit 32 such as a single circuit, a combined circuit, a programmed processor, a parallelly programmed processor, an ASIC (Application Specific Integrated Circuit) or an FPGA (Field Programmable Gate Array) as shown in FIG. 6B, for example.

Next, the operation in the first embodiment will be described below.

The ON/OFF control of the heater 22 at the time of printing is performed by controlling the triac 134 with an ACON signal outputted from the heater temperature control unit 183 of the main control unit 180.

In general, the triac 134 is capable of performing the ON/OFF control in cases of AC power, but is incapable of performing the OFF control in cases of DC power even though the ON control is possible. Therefore, if the supplied electric power switches to DC power in the middle of the printing, the triac 134 is incapable of turning off the electric power, the ON state continues, and the heater 22 remains on.

The operation in the first embodiment when DC power is supplied from the supplier (external power supply) as the commercial power supply owing to an accident or the like on the electric power supply side is stated below.

The supplied DC power is supplied to the power supply control IC 120 through the AC input unit 111, the fuse A 112, the filter A 113, the fuse B 114, the rectifier bridge 115, the electrolytic capacitor 116 and the resistor 117 of the low-voltage power supply 110.

When the DC power is supplied, the power supply control IC 120 starts up, and the power supply control IC 120 starts the switching operation of the FET 123. At that time, voltage occurs in the auxiliary winding on the third winding's side of the transformer 118. The voltage is smoothed by the diode 124 and the electrolytic capacitor 121 for rectification and smoothing, and the smoothed voltage is used as operating power for the power supply control IC 120.

When the switching operation of the FET 123 is started, voltage occurs on the secondary side of the transformer 118. The voltage occurring on the secondary side is rectified by the diode 125 and smoothed by the electrolytic capacitor 126, by which DC voltage stepped down is obtained. The voltage is fed back to an FB terminal of the power supply control IC 120 by the resistor 128, the resistor 132, the variable shunt regulator 131, the resistor 127 and the photocoupler 122, and the power supply control IC 120 performs constant voltage output control.

The power supply control IC 120 monitors the condition of electric current inputted to its IS terminal, and in case of overcurrent, the power supply control IC 120 stops the operation and stops the output. The operation described at this point is the same also when the supplied electric power is AC power.

Namely, irrespective of whether the supplied electric power is AC power or DC power, the voltage outputted from the transformer 118 is stepped-down DC voltage, and the DC voltage can be supplied to the main control unit 180.

Here, the operation when the image forming device 100 has shifted to a printing state (image forming state) will be described.

The DC power supplied to the image forming device 100 is inputted to the IN1 pin or the IN2 pin of the DC detection unit 130 through the AC input unit 111 and the fuse A 112 of the low-voltage power supply 110.

When the DC power is supplied to the DC detection unit 130, a dtc signal outputted from the dtcO pin of the DC detection unit 130 turns to the H level.

Specifically, when the DC power is supplied to the IN1 pin, voltage is applied to the resistor 130*a* shown in FIG. 3; however, the DC power is interrupted by the capacitor 130*b* and thereafter no electric current flows into the DC detection unit 130. Thus, the photocoupler 130*c* does not operate. Since the photocoupler 130*c* does not operate, the input through the +24 V pin is outputted from the dtcO pin and the dtc signal turns to the H level.

Since the output from the dtcO pin is inputted to the dtcI pin of the protection operation unit 129, the transistor 129*b* of the protection operation unit 129 turns to the ON state as shown in FIG. 4. When the image forming device 100 has shifted to the printing state, a Print signal of the print control unit 181 is at the H level. Since the Print signal of the print control unit 181 is connected to the Print pin of the protection operation unit 129, the transistor 129*c* of the protection operation unit 129 is also in the ON state.

Since both of the transistor 129*b* and the transistor 129*c* of the protection operation unit 129 are in the ON states, current flows into the relay coil part 129*a*. When current flows into the relay coil part 129*a*, the relay contact part 138*c* of the heater protection unit 138 shown in FIG. 5 turns on. In this case, the varistor 138*b* of the heater protection unit 138 is connected between LINE and NEUTRAL. If a varistor whose varistor voltage is 80 V, for example, is used as the varistor 138*b*, LINE and NEUTRAL turn to a short circuit condition when the supply voltage rises to 80 V or higher. When short-circuit current flows into the fuse C 138*a* of the heater protection unit 138, the fuse C 138*a* is blown and the supply of voltage to the heater 22 becomes impossible. By the above-described operation, the heater 22 can be stopped safely even when the heater 22 is in operation in the middle of the printing.

Next, the operation when the image forming device 100 has not shifted to the printing state will be described.

The DC power supplied to the image forming device 100 is inputted to the IN1 pin or the IN2 pin of the DC detection unit 130 through the AC input unit 111 and the fuse A 112 of the low-voltage power supply 110.

When the DC power is supplied to the DC detection unit 130, the output from the dtcO pin of the DC detection unit 130 turns to the H level. This is the same as the aforementioned operation.

Since the output from the dtcO pin is inputted to the dtcI pin of the protection operation unit 129, the transistor 129*b* of the protection operation unit 129 turns to the ON state.

When the image forming device 100 has not shifted to the printing state, the Print signal of the print control unit 181 is at the L level. Even though the Print signal of the print control unit 181 is inputted to the Print pin of the protection operation unit 129, the transistor 129*c* of the protection operation unit 129 is in the OFF state since the Print signal is at the L level.

In the protection operation unit 129, the transistor 129*c* is in the OFF state although the transistor 129*b* is in the ON state, and thus no current flows into the relay coil part 129*a* of the protection operation unit 129. Accordingly, the relay contact part 138*c* of the heater protection unit 138 remains off and the varistor 138*b* of the heater protection unit 138 is not connected between LINE and NEUTRAL. Since LINE and NEUTRAL do not turn to the short circuit condition, no short-circuit current flows into the fuse C 138*a* of the heater protection unit 138 and the fuse C 138*a* is not blown.

Figure 7:
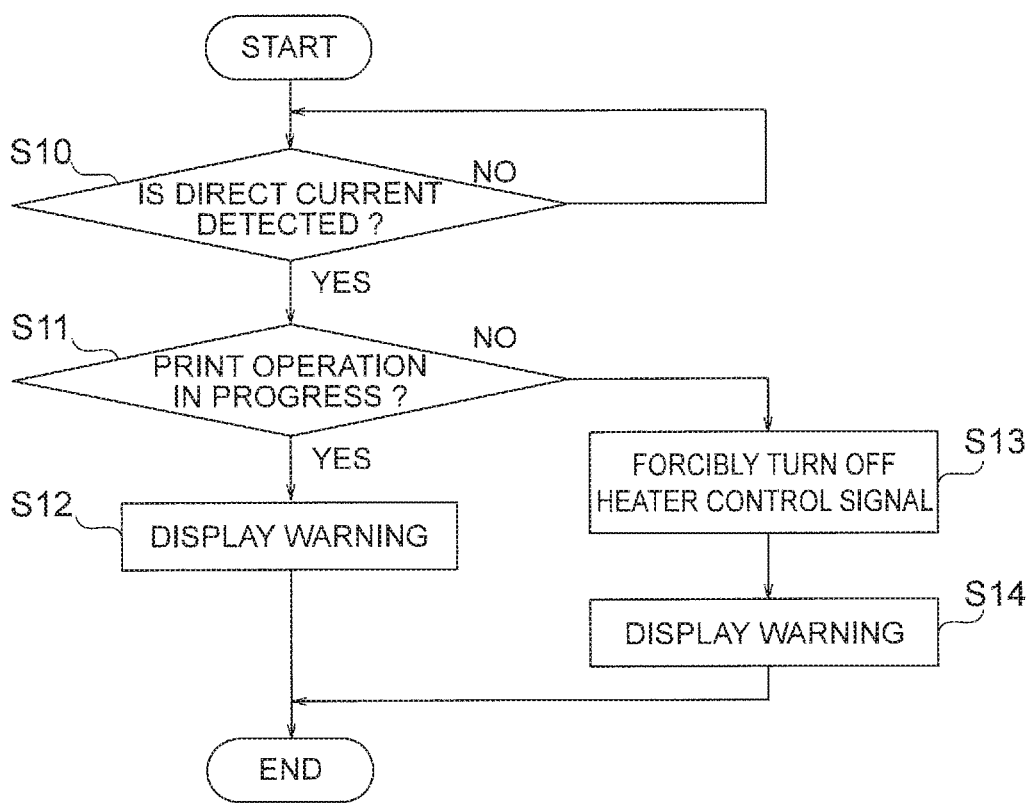
FIG. 7 is a flowchart showing the operation of an input power abnormality judgment unit in the first embodiment.

FIG. 7 is a flowchart showing the operation of the input power abnormality judgment unit 182 in the first embodiment.

The input power abnormality judgment unit 182 judges whether the DC detection unit 130 has detected direct current or not, based on the output from the dtcO pin of the DC detection unit 130 (S10). When direct current is detected (Yes in S10), the process proceeds to step S11.

In the step S11, the input power abnormality judgment unit 182 judges whether the print operation is in progress or not, based on the output from the print control unit 181 (S11). When the print operation is in progress (Yes in S11), the process proceeds to step S12. When the print operation is not in progress (No in S11), the process proceeds to step S13.

In the step S12, the input power abnormality judgment unit 182 commands the display control unit 184 to display a warning on the display unit 20. Here, the display unit 20 displays a message "Power supply input abnormality: direct current was detected. Heater protection circuit operated. Call serviceperson.", for example.

In contrast, in the step S13, the input power abnormality judgment unit 182 forcibly turns off a heater control signal by commanding the heater temperature control unit 183. This disables the heater temperature control unit 183 from setting the ACON signal as the output signal to the H level.

Then, the input power abnormality judgment unit 182 commands the display control unit 184 to display a warning on the display unit 20 (S14). Here, the display unit 20 displays a message "Power supply input abnormality: direct current was detected.", for example.

As above, when the electric power supply to the image forming device 100 turns to DC power in the middle of the image formation, the fuse C 138a of the heater protection unit 138 is operated according to the AND condition of the DC detection signal (dtc signal) from the DC detection unit 130 and the print control signal (Print signal) from the print control unit 181 and the supply of electric power to the heater 22 is forcibly disconnected, by which the heater 22 can be stopped safely even when the OFF control of the heater 22 is disabled by the supply of DC power owing to an accident on the electric power supply side. Incidentally, the print control signal (Print signal), which is a signal for switching between an operating state and a non-operating state of the heater 22, is referred to also as an operation signal.

Further, when the electric power supply turns to DC power when the image forming device 100 is on standby, the dtc signal and the Print signal are judged by the input power abnormality judgment unit 182 and the heater temperature control unit 183 is disabled from turning on the heater 22, by which the heater 22 can be protected before the OFF control of the heater 22 is disabled by the supply of DC power. In this case, the heater 22 can be stopped safely without blowing the fuse C 138a.

While the fuse C 138a is blown when abnormality in the input voltage (direct current) is detected and also the heater 22 is in the operating state (the print operation is in progress) in the first embodiment described above, the first embodiment is not limited to such an example.

For example, the first embodiment may be configured so that the fuse C 138a is blown when abnormality in the input voltage (direct current) is detected. In this case, it is permissible if the protection operation unit 129 shown in FIG. 4 is configured without the Print pin, the resistor 129e or the transistor 129c, for example.

Second Embodiment

As shown in FIG. 1, an image forming device 200 according to a second embodiment differs from the image forming device 100 according to the first embodiment in a low-voltage power supply 210 and a main control unit 280. The following description will be given mainly of the low-voltage power supply 210 and the main control unit 280.

Figure 8:
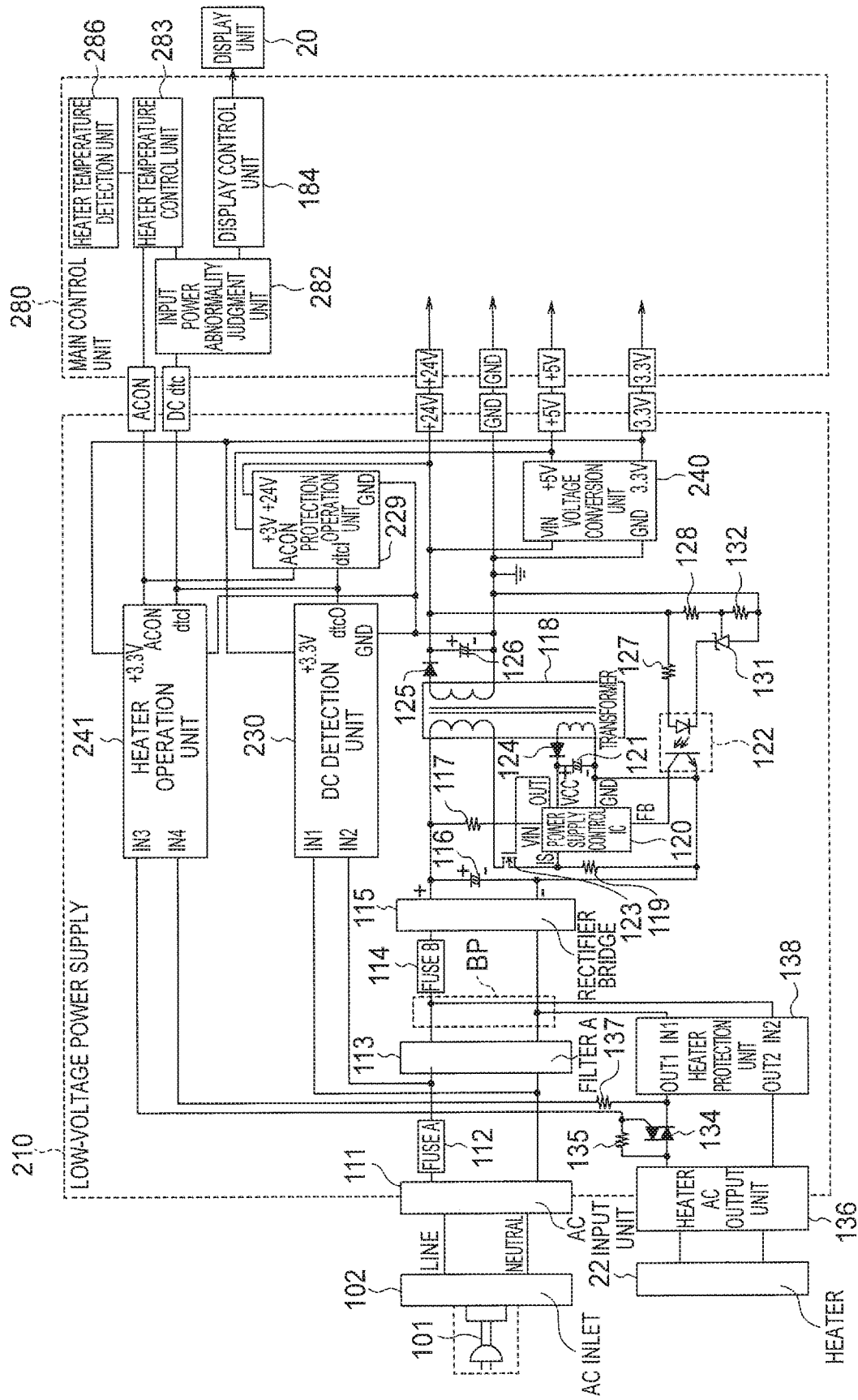
FIG. 8 is a block diagram showing the schematic configuration of a low-voltage power supply and a main control unit in an image forming device according to a second embodiment.

FIG. 8 is a block diagram showing the schematic configuration of the low-voltage power supply 210 and the main control unit 280 in the image forming device 200 according to the second embodiment.

FIG. 8 shows parts relevant to features of the second embodiment, which are extracted from the low-voltage power supply 210 and the main control unit 280.

The power cord 101 is connected to the commercial power supply (AC power supply). The power cord 101 is connected to the AC inlet 102, and the AC inlet 102 is connected to the AC input unit 111 of the low-voltage power supply 210.

The LINE side of the AC input unit 111 is connected to the fuse A 112. The fuse A 112 is connected to the filter A 113 and an IN2 pin of a DC detection unit 230.

The NEUTRAL side of the AC input unit 111 is connected to the filter A 113 and an IN1 pin of the DC detection unit 230.

The filter A 113 is connected to the fuse B 114 and the IN2 pin of the heater protection unit 138.

Further, the filter A 113 is connected to the input side of the rectifier bridge 115 and the IN1 pin of the heater protection unit 138.

The fuse B 114 is connected to the input side of the rectifier bridge 115.

The + terminal on the output side of the rectifier bridge 115 is connected to the + terminal of the electrolytic capacitor 116, the resistor 117, and the primary side of a transformer 118.

The − terminal on the output side of the rectifier bridge 115 is connected to the − terminal of the electrolytic capacitor 116, the resistor 119, the GND pin of the power supply control IC 120, the − terminal of the electrolytic capacitor 121, the third winding's side of the transformer 118, and the emitter of the photocoupler 122.

The resistor 117 is connected to the VIN pin of the power supply control IC 120.

The source of the FET 123 is connected to the primary side of the transformer 118, the drain of the FET 123 is connected to the resistor 119 and the IS pin of the power supply control IC 120, and the gate of the FET 123 is connected to the OUT pin of the power supply control IC 120.

The third winding's side of the transformer 118 is connected with the anode of the diode 124, and the cathode of the diode 124 is connected to the + terminal of the electrolytic capacitor 121 and the VCC pin of the power supply control IC 120.

The collector of the photocoupler 122 is connected to the FB pin of the power supply control IC 120.

The secondary side of the transformer 118 is connected to the anode of the diode 125, and the cathode of the diode 125 is connected to the + terminal of the electrolytic capacitor 126, the resistor 127, the resistor 128, a +24 V pin of a protection operation unit 229, a VIN pin of a voltage conversion unit 240, and a +24 V output pin of the low-voltage power supply 210.

Further, the secondary side of the transformer 118 is connected to the anode of the variable shunt regulator 131, the − terminal of the electrolytic capacitor 126, the resistor 132, a GND pin of the protection operation unit 229, a GND pin of the DC detection unit 230, a GND pin of a heater operation unit 241, a GND pin of the voltage conversion unit 240, and a GND output pin of the low-voltage power supply 210.

The anode of the photocoupler 122 is connected to the resistor 127.

The cathode of the photocoupler 122 is connected to the cathode of the variable shunt regulator 131.

The reference pin of the variable shunt regulator 131 is connected to the resistor 128 and the resistor 132.

An IN3 pin of the heater operation unit 241 is connected to the gate of the triac 134 and the resistor 135.

The resistor 135 is connected to the triac 134 and the heater AC output unit 136.

The triac 134 is connected to the resistor 137 and the OUT1 pin of the heater protection unit 138.

An IN4 pin of the heater operation unit 241 is connected to the resistor 137.

The OUT2 pin of the heater protection unit 138 is connected to the heater AC output unit 136.

A +5 V pin of the voltage conversion unit 240 is connected to a +5 V pin of the protection operation unit 229 and a +5 V output pin of the low-voltage power supply 210.

A +3.3 V pin of the voltage conversion unit 240 is connected to a +3.3 V pin of the DC detection unit 230, a +3.3 V pin of the heater operation unit 241, and a +3.3 V output pin of the low-voltage power supply 210.

A dtcO pin of the DC detection unit 230 is connected to a dtcI pin of the protection operation unit 229 and a dtcI pin of the heater operation unit 241, and is connected via the DC dtc connector to an input power abnormality judgment unit 282 in the main control unit 280.

The output of the input power abnormality judgment unit 282 is inputted to a heater temperature control unit 283 and the display control unit 184.

The display control unit 184 is connected to the display unit 20.

A temperature detection signal of a heater temperature detection unit 286 is supplied to the heater temperature control unit 283, and the heater control signal of the heater temperature control unit 283 is inputted to an ACON pin of the heater operation unit 241 and an ACON pin of the protection operation unit 229 via the ACON connector.

Multiple levels of voltages (+24 V, +5 V, +3.3 V, GND) existing in the main control unit 280 are supplied to circuits in the main control unit 280.

Incidentally, while the heater temperature detection unit 286 is provided in the main control unit 280, the heater temperature detection unit 286 may be provided outside the main control unit 280.

Here, the electric wire connected to the IN2 pin of the heater protection unit 138 is connected to the electric wire between the filter A 113 and the fuse B 114, and the electric wire connected to the IN1 pin of the heater protection unit 138 is connected to the electric wire between the filter A 113 and the rectifier bridge 115.

Put another way, in the image forming device 200, voltage from the commercial power supply is inputted to the AC inlet 102, the input voltage as the voltage inputted to the AC inlet 102 is converted into desired voltage, and the image forming device 200 includes a first path supplying and inputting the desired voltage to the main control unit 280 and a second path branching off from the first path at the branch point BP and supplying the input voltage to the heater 22. The heater 22, the triac 134 and the heater protection unit 138 are connected in series in the second path.

Figure 9:
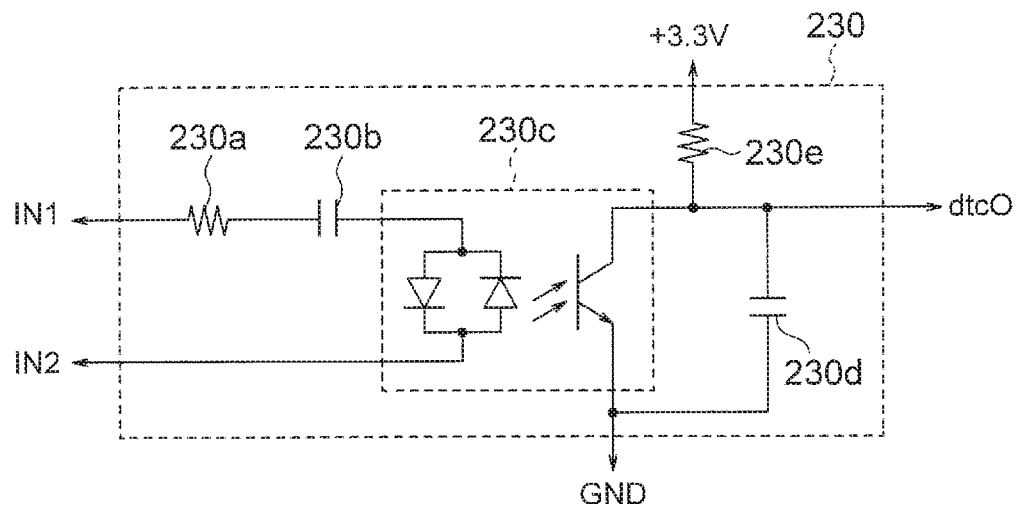
FIG. 9 is a circuit diagram showing an example of a DC detection unit in the second embodiment.

FIG. 9 is a circuit diagram showing an example of the DC detection unit 230 in the second embodiment.

The DC detection unit 230 includes a resistor 230a, a capacitor 230b, a photocoupler 230c, a resistor 230e and a capacitor 230d.

The resistor 230a is connected to the IN1 pin of the DC detection unit 230.

Further, the resistor 230a is connected to the capacitor 230b.

The capacitor 230b is connected to the photocoupler 230c.

The photocoupler 230c is connected to the IN2 pin of the DC detection unit 230.

Further, the collector of the photocoupler 230c is connected to the resistor 230e, the capacitor 230d and the dtcO pin of the DC detection unit 230.

Furthermore, the emitter pin of the photocoupler 230c is connected to the capacitor 230d and the GND pin of the DC detection unit 230.

The DC detection unit 230 functions as the input abnormality detection unit that detects abnormality in the input voltage as the voltage inputted from the commercial power supply. Here, the DC detection unit 230 detects abnormality when the input voltage is DC voltage.

Figure 10:
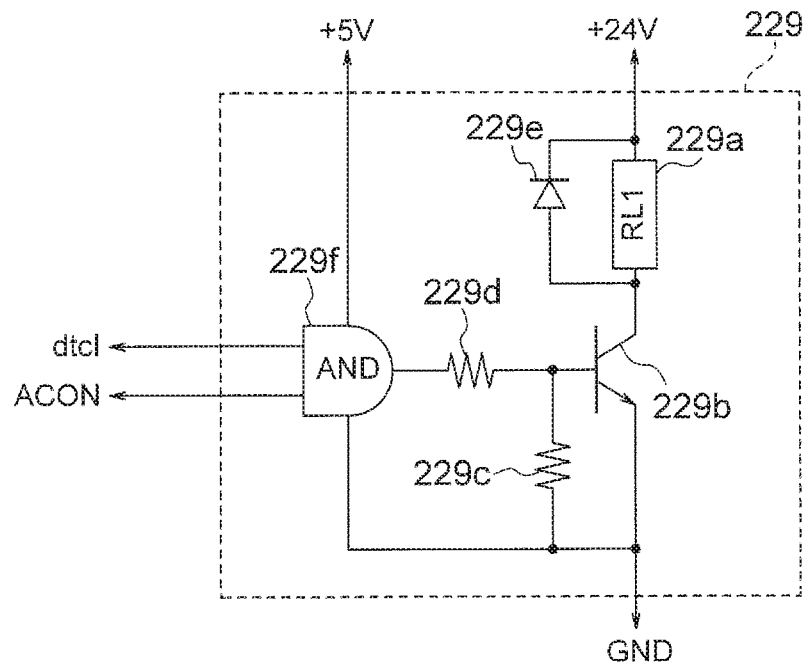
FIG. 10 is a circuit diagram showing an example of a protection operation unit in the second embodiment.

FIG. 10 is a circuit diagram showing an example of the protection operation unit 229 in the second embodiment.

The protection operation unit 229 includes a relay coil part 229a, a transistor 229b, a resistor 229c, a resistor 229d, a diode 229e and an AND circuit 229f.

A magnetic circuit is formed between the relay coil part 229a and the relay contact part 138c, and the relay coil part 229a and the relay contact part 138c function as an electromagnetic relay.

The relay coil part 229a is connected to the cathode of the diode 229e and the +24 V pin of the protection operation unit 229.

Further, the relay coil part 229a is connected to the anode of the diode 229e and the collector of the transistor 229b.

The base of the transistor 229b is connected to the resistor 229d and the resistor 229c.

The emitter of the transistor 229b is connected to the resistor 229c, a GND pin of the AND circuit 229f, and the GND pin of the protection operation unit 229.

The resistor 229d is connected to an output pin of the AND circuit 229f.

Input pins of the AND circuit 229f are respectively connected to the dtcI pin of the protection operation unit 229 and the ACON pin of the protection operation unit 229.

Figure 11:
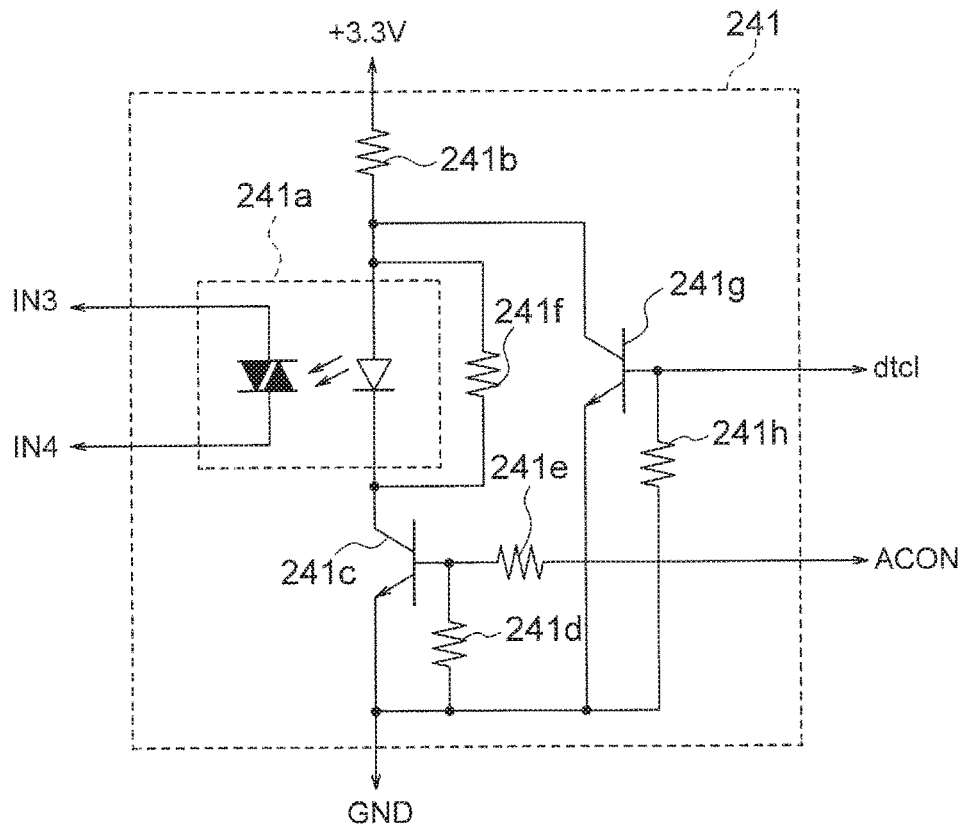
FIG. 11 is a circuit diagram showing an example of a heater operation unit in the second embodiment.

FIG. 11 is a circuit diagram showing an example of the heater operation unit 241 in the second embodiment.

The heater operation unit 241 includes a phototriac coupler 241a, a resistor 241b, a transistor 241c, a resistor 241d, a resistor 241e, a resistor 241f, a transistor 241g and a resistor 241h.

The phototriac coupler 241a is connected to the IN3 pin of the heater operation unit 241.

Further, the phototriac coupler 241a is connected to the IN4 pin of the heater operation unit 241.

The resistor 241b is connected to the +3.3 V pin of the heater operation unit 241.

Further, the resistor 241b is connected to the anode of the phototriac coupler 241a, the resistor 241f, and the collector of the transistor 241g.

The cathode of the phototriac coupler 241a is connected to the resistor 241f and the collector of the transistor 241c.

The emitter of the transistor 241c is connected to the resistor 241d, the emitter of the transistor 241g, the resistor 241h, and the GND pin of the heater operation unit 241.

The base of the transistor 241c is connected to the resistor 241d and the resistor 241e.

The resistor 241e is connected to the ACON pin of the heater operation unit 241.

The base of the transistor 241g is connected to the resistor 241h and the dtcI pin of the heater operation unit 241.

Part or all of the input power abnormality judgment unit 282, the heater temperature control unit 283 and the display control unit 184 of the main control unit 280 described above can be implemented by a memory 30 and a processor 31 such as a CPU for executing a program stored in the memory 30 as shown in FIG. 6A, for example. Such a program may be provided via a network, or provided in the form of being stored in a record medium. Namely, such a program may be provided as a program product, for example.

Part or all of the input power abnormality judgment unit 282, the heater temperature control unit 283 and the display control unit 184 of the main control unit 280 are also implemented by a processing circuit 32 such as a single circuit, a combined circuit, a programmed processor, a parallelly programmed processor, an ASIC or an FPGA as shown in FIG. 6B, for example.

Incidentally, the heater temperature detection unit 286 can be implemented by a sensor that detects the temperature of the heater 22.

Next, the operation in the second embodiment will be described below.

The ON/OFF control of the heater 22 at the time of printing is performed by turning the triac 134 on or off via the heater operation unit 241 with an ACON signal outputted from the heater temperature control unit 283 based on the temperature detected by the heater temperature detection unit 286 of the main control unit 280.

As described in the first embodiment, irrespective of whether AC power is supplied from the electric power supply side or DC power is supplied from the supplier as the commercial power supply owing to an accident or the like on the electric power supply side, for example, the main control unit 280 is capable of obtaining stepped-down DC voltage and thus is capable of executing the process.

Here, the operation when DC power is supplied from the electric power supply side in a case where the image forming device 200 has set the heater 22 to the ON state will be described first. Incidentally, the ON state is a state in which the triac 134 has turned on the heater 22 according to a command (ACON signal) from the heater temperature control unit 283.

The supplied DC power is inputted to the IN1 pin or the IN2 pin of the DC detection unit 230 through the AC input unit 111 and the fuse A 112 of the low-voltage power supply 210.

When the DC power is supplied to the DC detection unit 230, the output from the dtcO pin of the DC detection unit 230 turns to the H level.

Specifically, as shown in FIG. 9, when the DC power is supplied to the IN1 pin, voltage is applied to the resistor 230a; however, the DC power is interrupted by the capacitor 230b and no current flows into the DC detection unit 230. Thus, the photocoupler 230c does not operate.

As the photocoupler 230c does not operate, the input through the +3.3 V pin is outputted from the dtcO pin and thus the output turns to the H level.

Since the output from the dtcO pin is connected to the dtcI pin of the protection operation unit 229, the H level is inputted to the dtcI pin of the protection operation unit 229.

When the temperature detected by the heater temperature detection unit 286 is lower than or equal to a target temperature, the heater temperature control unit 283 outputs the ACON signal at the H level for a prescribed time or longer.

Since the ACON signal of the heater temperature control unit 283 is inputted to the ACON pin of the protection operation unit 229, the H level is inputted to the ACON pin of the protection operation unit 229.

Since the input signals to the AND circuit 229f shown in FIG. 10 are both at the H levels, the AND circuit 229f outputs the H level. Accordingly, base current flows into the transistor 229b via the resistor 229d and current flows into the relay coil part 229a of the protection operation unit 229.

When the current flows into the relay coil part 229a, the relay contact part 138c of the heater protection unit 138 shown in FIG. 5 turns on. In this case, the varistor 138b of the heater protection unit 138 is connected between LINE and NEUTRAL. If a varistor whose varistor voltage is 80 V, for example, is used as the varistor 138b, LINE and NEUTRAL turn to the short circuit condition when the supply voltage rises to 80 V or higher. When short-circuit current flows into the fuse C 138a of the heater protection unit 138, the fuse C 138a is blown and the supply of voltage to the heater 22 becomes impossible. By the above-described operation, the heater 22 can be stopped safely even when the heater 22 is in the ON state.

As above, the fuse C 138a is blown by the protection operation unit 229 when the DC detection unit 230 detects DC power and the triac 134 has turned on the heater 22.

Even when the DC detection unit 230 detects DC power, the fuse C 138a is not blown when the triac 134 has not turned on the heater 22.

Next, the operation when DC power is supplied from the electric power supply side in a case where the image forming device 200 has set the heater 22 to the OFF state will be described below. Here, the OFF state is a state in which the triac 134 has turned off the heater 22 according to a command (ACON signal) from the heater temperature control unit 283.

The supplied DC power is inputted to the IN1 pin or the IN2 pin of the DC detection unit 230 through the AC input unit 111 and the fuse A 112 of the low-voltage power supply 210.

When the DC power is supplied to the DC detection unit 230, the H level is outputted from the dtcO pin of the DC detection unit 230 as described earlier. Since the dtcO pin of the DC detection unit 230 is connected to the dtcI pin of the heater operation unit 241 shown in FIG. 11, the H level is inputted to the dtcI pin of the heater operation unit 241.

Accordingly, current flows into the base of the transistor 241g of the heater operation unit 241 and collector current flows into the transistor 241g from the +3.3 V pin of the heater operation unit 241 via the resistor 241b. As a result, the voltage source for the phototriac coupler 241a is interrupted. Thus, the light-emitting diode of the phototriac coupler 241a cannot light up and the triac of the phototriac coupler 241a remains in the open state. Accordingly, the triac 134 for controlling the heater 22 remains in the open state and no current flows into the heater 22.

Further, the dtcO pin of the DC detection unit 230 is connected to the dtcI pin of the protection operation unit 229 shown in FIG. 10. When the heater 22 is in the OFF state in the image forming device 200, the heater temperature control unit 283 outputs the L level as the ACON signal.

The ACON signal of the heater temperature control unit 283 is inputted to the ACON pin of the protection operation unit 229, and the AND circuit 229f of the protection operation unit 229 outputs the L level. Accordingly, no base current flows into the transistor 229b and no current flows into the relay coil part 229a of the protection operation unit 229.

Since no current flows into the relay coil part 229a, the relay contact part 138c of the heater protection unit 138 shown in FIG. 5 remains off and the varistor 138b of the heater protection unit 138 is not connected between LINE and NEUTRAL. Since LINE and NEUTRAL do not enter the short circuit condition, no short-circuit current flows into the fuse C 138a and the fuse C 138a is not blown.

Figure 12:
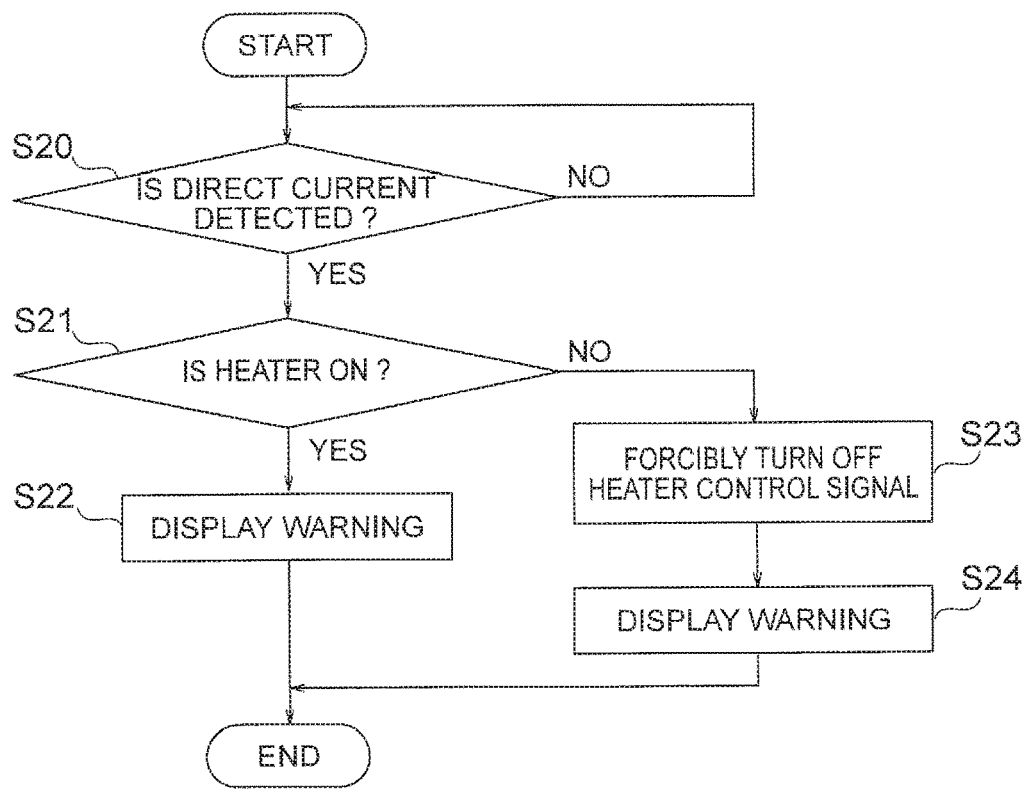
FIG. 12 is a flowchart showing the operation of an input power abnormality judgment unit in the second embodiment.

FIG. 12 is a flowchart showing the operation of the input power abnormality judgment unit 282 in the second embodiment.

The input power abnormality judgment unit 282 judges whether the DC detection unit 230 has detected direct current or not based on the output from the dtcO pin of the DC detection unit 230 (S20). When direct current is detected (Yes in S20), the process proceeds to step S21.

In the step S21, the input power abnormality judgment unit 282 judges whether or not the heater temperature control unit 283 has turned on the heater 22. For example, the input power abnormality judgment unit 282 may make this judgment based on a notification from the heater temperature control unit 283. When the heater 22 is on (Yes in S21), the process proceeds to step S22. When the heater 22 is not on (No in S21), the process proceeds to step S23.

In the step S22, the input power abnormality judgment unit 282 commands the display control unit 184 to display a warning on the display unit 20. Here, the display unit 20 displays, for example, the message "Power supply input abnormality: direct current was detected. Heater protection circuit operated. Call serviceperson."

In contrast, in the step S23, the input power abnormality judgment unit 282 commands the heater temperature control unit 283 and thereby forcibly turns off the heater control signal (ACON signal). This disables the heater temperature control unit 283 from outputting the H level as the ACON signal to be outputted.

Then, the input power abnormality judgment unit 282 commands the display control unit 184 to display a warning on the display unit 20 (S24). Here, the display unit 20 displays, for example, the message "Power supply input abnormality: direct current was detected."

Incidentally, in the second embodiment, it is assumed that the DC detection unit 230, the protection operation unit 229 and the heater operation unit 241 are implemented by hardware, and that firmware of the input power abnormality judgment unit 282 or the like malfunctions.

For example, when the input power abnormality judgment unit 282 erroneously judges that DC power is inputted irrespective of the actual situation in which the heater 22 is on and AC power is inputted to the low-voltage power supply 210, processing by the firmware erroneously operates the protection operation unit 229 and blows the fuse C 138a of the heater protection unit 138.

In the second embodiment, even in such cases, the output of the DC detection unit 230 is set at not the H level but the L level, and thus the AND circuit 229f of the protection operation unit 229 outputs the L level and the fuse C 138a is not blown.

Further, when the input power abnormality judgment unit 282 erroneously judges that AC power is inputted irrespective of the actual situation in which the heater 22 is on and DC power is inputted to the low-voltage power supply 210, processing by the firmware is incapable of making the protection operation unit 229 operate, the triac 134 remains on, the heater 22 remains on, and safety is impaired.

In the second embodiment, even in such cases, the output of the DC detection unit 230 is set at not the L level but the H level, and thus the voltage source for the heater operation unit 241 is interrupted and the AND circuit 229f of the protection operation unit 229 outputs the H level, by which the fuse C 138a is blown and the heater 22 is protected successfully.

As described above, according to the second embodiment, the heater 22 can be stopped safely even when the triac 134 is disabled from performing the OFF control of the heater 22 owing to the supply of DC power while the heater 22 is on.

Further, when DC power is supplied while the heater 22 is off, the heater 22 can be protected before the triac 134 is disabled from performing the OFF control of the heater 22, the fuse C 138a is not blown, and the heater 22 can be stopped safely.

Third Embodiment

As shown in FIG. 1, an image forming device 300 according to a third embodiment differs from the image forming device 200 according to the second embodiment in a low-voltage power supply 310 and a main control unit 380. The following description will be given mainly of the low-voltage power supply 310 and the main control unit 380.

Figure 13:
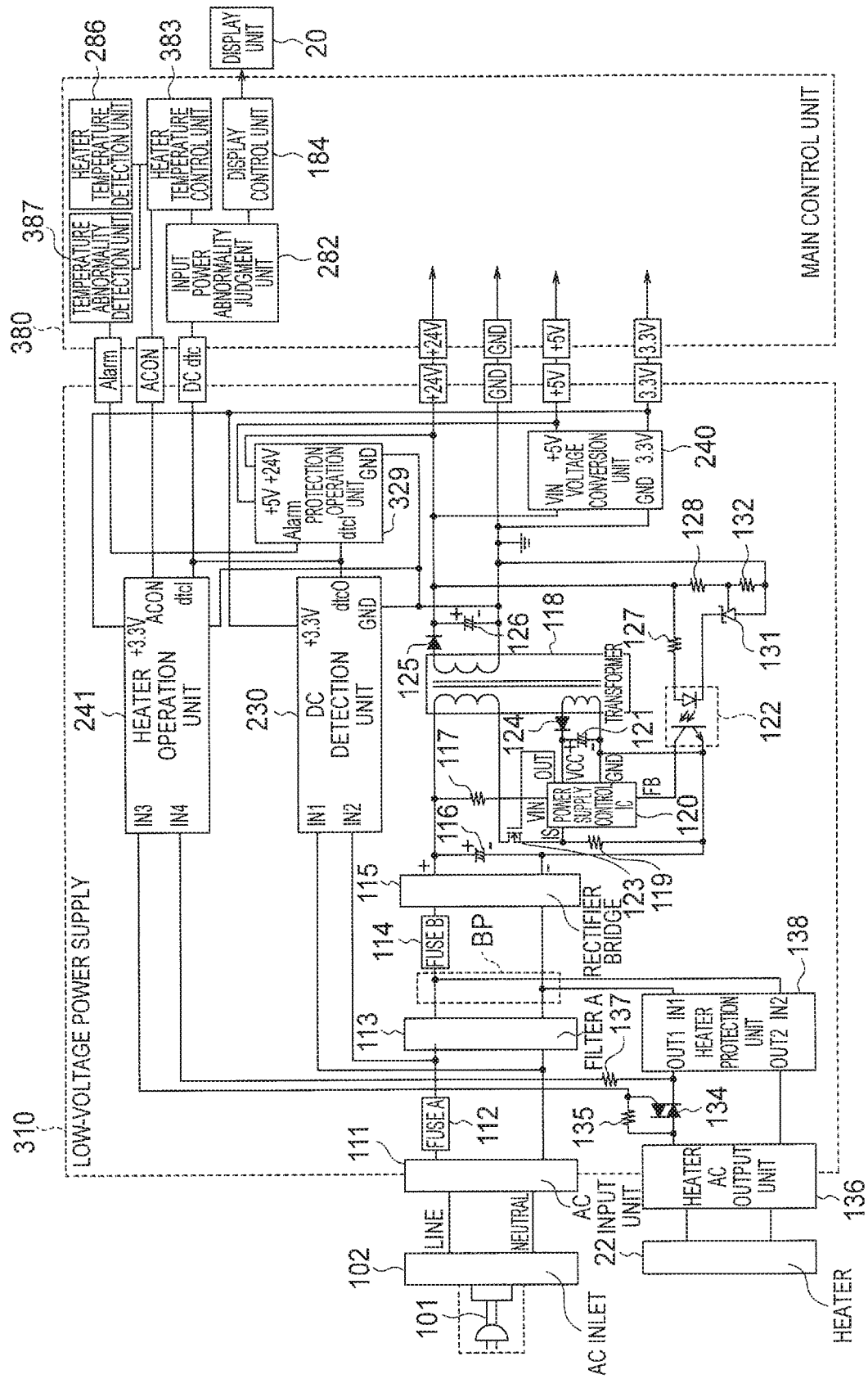
FIG. 13 is a block diagram showing the schematic configuration of a low-voltage power supply and a main control unit in an image forming device according to a third embodiment.

FIG. 13 is a block diagram showing the schematic configuration of the low-voltage power supply 310 and the main control unit 380 in the image forming device 300 according to the third embodiment.

FIG. 13 shows parts relevant to features of the third embodiment, which are extracted from the low-voltage power supply 310 and the main control unit 380.

Incidentally, the third embodiment differs from the second embodiment in that a temperature abnormality detection unit 387 is added to the main control unit 380 and in the operation of a protection operation unit 329 of the low-voltage power supply 310. Parts relevant to the differences from the second embodiment will be mainly described below.

The main control unit 380 in the third embodiment is provided with the temperature abnormality detection unit 387.

The temperature abnormality detection unit 387 detects situations in which the temperature of the heater 22 has abnormally risen over the target temperature based on the temperature detected by the heater temperature detection unit 286. For example, the temperature abnormality detection unit 387 detects the temperature abnormality when the detected temperature exceeds a predetermined threshold value. When the abnormal temperature is detected, the temperature abnormality detection unit 387 notifies a heater temperature control unit 383 of the fact and sets an Alarm signal, as a temperature abnormality signal outputted from an Alarm connector of the main control unit 380, to the H level.

While the protection operation unit 229 of the low-voltage power supply 210 in the second embodiment receives the ACON signal outputted from the heater temperature control unit 283, the protection operation unit 329 of the low-voltage power supply 310 in the third embodiment receives the Alarm signal outputted from the temperature abnormality detection unit 387.

Specifically, an Alarm pin of the protection operation unit 329 is connected to an Alarm pin of the main control unit 380.

Figure 14:
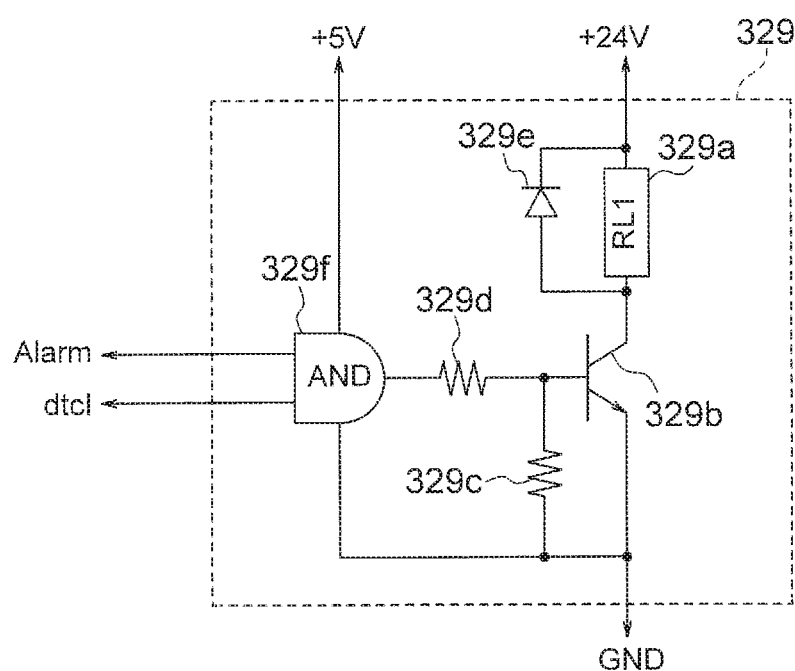
FIG. 14 is a circuit diagram showing an example of a protection operation unit in the third embodiment.

FIG. 14 is a circuit diagram showing an example of the protection operation unit 329 in the third embodiment.

The protection operation unit 329 includes a relay coil part 329a, a transistor 329b, a resistor 329c, a resistor 329d, a diode 329e and an AND circuit 329f.

A magnetic circuit is formed between the relay coil part 329a and the relay contact part 138c, and the relay coil part 329a and the relay contact part 138c function as an electromagnetic relay.

The relay coil part 329a is connected to the cathode of the diode 329e and a +24 V pin of the protection operation unit 329.

Further, the relay coil part 329a is connected to the anode of the diode 329e and the collector of the transistor 329b.

The base of the transistor 329b is connected to the resistor 329d and the resistor 329c.

The emitter of the transistor 329b is connected to the resistor 329c, a GND pin of the AND circuit 329f, and a GND pin of the protection operation unit 329.

The resistor 329d is connected to an output pin of the AND circuit 329f.

Input pins of the AND circuit 329f are respectively connected to a dtcI pin of the protection operation unit 329 and the Alarm pin of the main control unit 380.

Next, the operation in the third embodiment will be described below.

In the second embodiment, the fuse C 138a of the heater protection unit 138 is blown when DC voltage is applied even temporarily in a case where the heater 22 is on.

In contrast, the third embodiment takes into consideration cases where DC voltage is temporarily applied to the DC detection unit 230 and thereafter the input returns to AC voltage.

When the temperature detected by the heater temperature detection unit 286 is lower than or equal to the target temperature, the heater temperature control unit 383 outputs the H level as the ACON signal, thereby activates the heater operation unit 241 to turn on the triac 134, and thereby turns on the heater 22.

When the DC detection unit 230 detects DC voltage, the DC detection unit 230 sets the output from the dtcO pin at the H level. When the H level is inputted to the dtcI pin, the heater operation unit 241 interrupts the voltage source for the heater operation unit 241.

Based on the dtc signal from the DC detection unit 230, the input power abnormality judgment unit 282 also judges that DC voltage has been applied, and notifies the heater temperature control unit 383 that the heater 22 should be turned off. According to the notification, the heater temperature control unit 383 sets the ACON signal to the L level.

When DC power is inputted irrespective of the situation in which the voltage source for the heater operation unit 241 has been interrupted and the ACON signal has been set to the L level, the triac 134 is incapable of turning off and remains on. Accordingly, the heater 22 cannot be turned off and the temperature detected by the heater temperature detection unit 286 keeps on rising.

When the temperature of the heater 22 detected by the heater temperature detection unit 286 exceeds the threshold value as a preset temperature of the temperature abnormality detection unit 387, the temperature abnormality detection unit 387 sets the Alarm signal to the H level.

Since the Alarm signal and the dtc signal inputted to the protection operation unit 329 are both set at the H levels, the AND circuit 329f of the protection operation unit 329 shown in FIG. 14 outputs the H level. Accordingly, base current flows into the transistor 329b via the resistor 329d and current flows into the relay coil part 329a of the protection operation unit 329.

When the current flows into the relay coil part 329a, the relay contact part 138c of the heater protection unit 138 shown in FIG. 5 turns on. In this case, the varistor 138b of the heater protection unit 138 is connected between LINE and NEUTRAL. If a varistor whose varistor voltage is 80 V, for example, is used as the varistor 138b, LINE and NEUTRAL turn to the short circuit condition when the supply voltage rises to 80 V or higher. When short-circuit current flows into the fuse C 138a of the heater protection unit 138, the fuse C 138a is blown and the supply of voltage to the heater 22 becomes impossible. By the above-described operation, the heater 22 can be stopped safely even when the heater 22 is in the ON state.

The fuse C 138a is blown by the protection operation unit 329 when DC power is detected by the DC detection unit 230 and the temperature of the heater 22 exceeds the predetermined threshold value.

Further, when the temperature detected by the heater temperature detection unit 286 is lower than or equal to the target temperature, the heater temperature control unit 383 outputs the ACON signal at the H level, thereby activates the heater operation unit 241 to turn on the triac 134, and thereby turns on the heater 22.

When the DC detection unit 230 detects DC voltage, the DC detection unit 230 sets the output from the dtcO pin at the H level. When the H level is inputted to the dtcI pin, the heater operation unit 241 interrupts the voltage source for the heater operation unit 241.

Based on the dtc signal from the DC detection unit 230, the input power abnormality judgment unit 282 also judges that DC voltage has been applied, and notifies the heater temperature control unit 383 that the heater 22 should be turned off. According to the notification, the heater temperature control unit 383 sets the ACON signal to the L level.

When DC power is inputted irrespective of the situation in which the voltage source for the heater operation unit 241 has been interrupted and the ACON signal has been set to the L level, the triac 134 is incapable of turning off and remains on. Accordingly, the heater 22 cannot be turned off and the temperature detected by the heater temperature detection unit 286 keeps on rising.

In this case, when AC voltage is detected, the DC detection unit 230 sets the output from the dtcO pin to the L level. The change from DC to AC enable the triac 134 to turn off, and consequently, the heater 22 can also be turned off.

Here, when the temperature of the heater 22 detected by the heater temperature detection unit 286 is below the threshold value as the preset temperature of the temperature abnormality detection unit 387, the temperature abnormality detection unit 387 sets the Alarm signal at the L level.

Since the Alarm signal and the dtc signal inputted to the protection operation unit 329 are both set at the L levels, the AND circuit 329f of the protection operation unit 329 shown in FIG. 14 outputs the L level. In this case, no base current flows into the transistor 329b. Accordingly, no current flows into the relay coil part 329a of the protection operation unit 329.

Since no current flows into the relay coil part 329a, the relay contact part 138c of the heater protection unit 138 shown in FIG. 5 remains off and the varistor 138b of the heater protection unit 138 is not connected between LINE and NEUTRAL. Since LINE and NEUTRAL do not enter the short circuit condition, no short-circuit current flows into the fuse C 138a and the fuse C 138a is not blown.

As described above, according to the third embodiment, even when DC voltage is applied to the low-voltage power supply 310 when the heater 22 is on, the fuse C 138a is not blown until the temperature of the heater 22 rises to the abnormal temperature, and thus it is possible to continue using the image forming device 300 without blowing the fuse C 138a in cases where DC voltage is applied temporarily and the supply voltage quickly returns to AC voltage.

Fourth Embodiment

As shown in FIG. 1, an image forming device 400 according to a fourth embodiment differs from the image forming device 200 according to the second embodiment in a low-voltage power supply 410 and a main control unit 480. The following description will be given mainly of the low-voltage power supply 410 and the main control unit 480.

Figure 15:
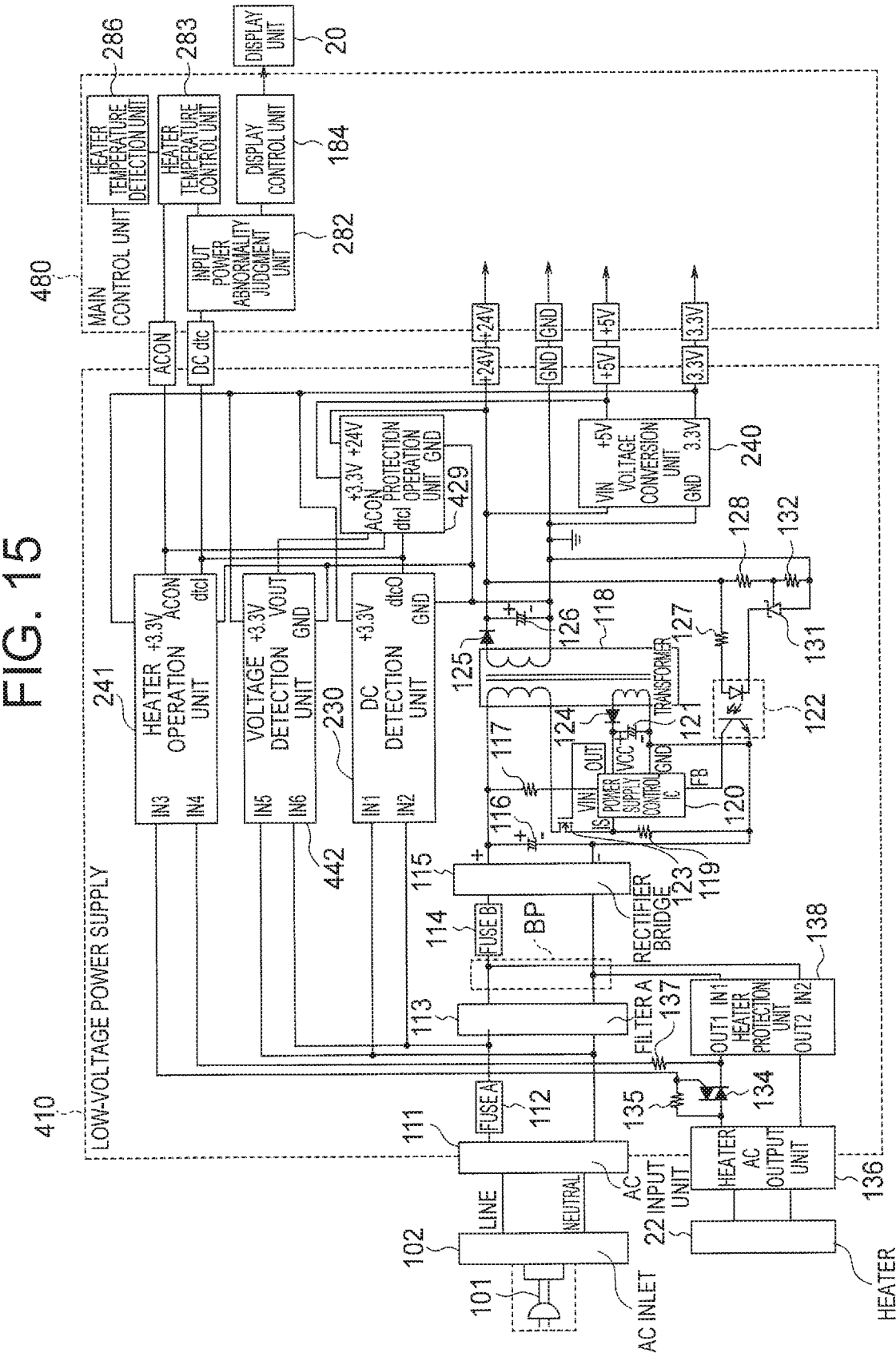
FIG. 15 is a block diagram showing the schematic configuration of a low-voltage power supply and a main control unit in an image forming device according to a fourth embodiment.

FIG. 15 is a block diagram showing the schematic configuration of the low-voltage power supply 410 and the main control unit 480 in the image forming device 400 according to the fourth embodiment.

FIG. 15 shows parts relevant to features of the fourth embodiment, which are extracted of the low-voltage power supply 410 and the main control unit 480.

Incidentally, the fourth embodiment differs from the second embodiment in that a voltage detection unit 442 is added to the low-voltage power supply 410 and in the operation of a protection operation unit 429 of the low-voltage power supply 410. Parts relevant to the differences from the second embodiment will be mainly described below.

The low-voltage power supply 410 in the fourth embodiment is provided with the voltage detection unit 442.

The voltage detection unit 442 detects whether voltage is inputted to the low-voltage power supply 410 or not, in order to judge whether the result of the detection by the DC detection unit 230 was caused by instantaneous power interruption of the commercial power supply or application of DC voltage. A Vout signal as a voltage detection signal indicating the result of the detection by the voltage detection unit 442 is supplied to the protection operation unit 429.

An IN5 pin of the voltage detection unit 442 is connected to the input side of a step-down transformer 442a, the IN1 pin of the DC detection unit 230, the filter A 113, and the NEUTRAL side of the AC input unit 111.

An IN6 pin of the voltage detection unit 442 is connected to the input side of the step-down transformer 442a, the IN2 pin of the DC detection unit 230, the filter A 113, and the fuse A 112.

A +3.3 V pin of the voltage detection unit 442 is connected to the +3.3 V pin of the voltage conversion unit 240.

A GND pin of the voltage detection unit 442 is connected to the GND pin of the heater operation unit 241, the GND pin of the DC detection unit 230, a GND pin of the protection operation unit 429, the − terminal of the electrolytic capacitor 126, and a GND pin of the low-voltage power supply 410.

A Vout pin of the voltage detection unit 442 is connected to a Vout pin of the protection operation unit 429.

Figure 16:
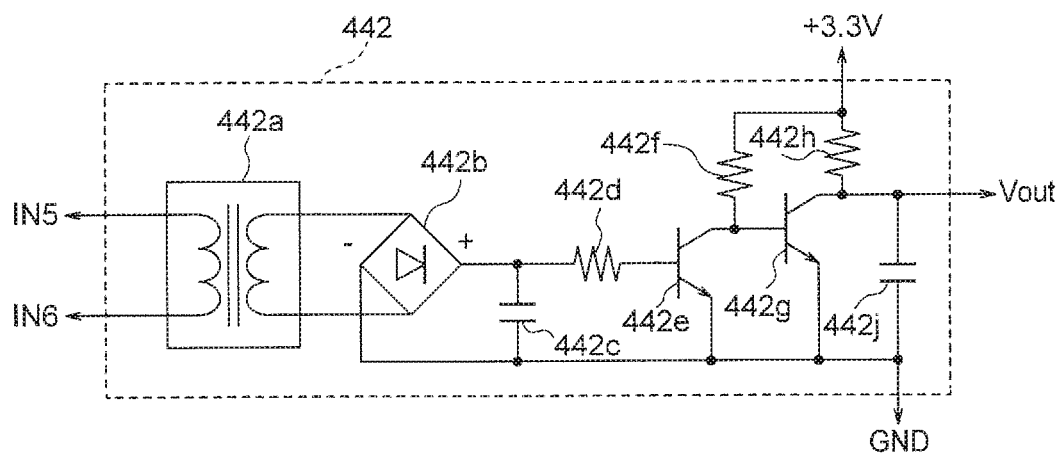
FIG. 16 is a circuit diagram showing an example of a voltage detection unit in the fourth embodiment.

FIG. 16 is a circuit diagram showing an example of the voltage detection unit 442 in the fourth embodiment.

The input side of the step-down transformer 442a is connected to the IN5 pin and the IN6 pin of the voltage detection unit 442.

The output side of the step-down transformer 442a is connected to the input side of a bridge diode 442b.

The + pin of the bridge diode 442b is connected to a capacitor 442c and a resistor 442d.

The − pin of the bridge diode 442b is connected to the capacitor 442c, the emitter of a transistor 442e, the emitter of a transistor 442g, a capacitor 442j, and the GND pin of the voltage detection unit 442.

The resistor 442d is connected to the base of the transistor 442e.

The collector of the transistor 442e is connected to a resistor 442f and the base of the transistor 442g.

The collector of the transistor 442g is connected to a resistor 442h, the capacitor 442j, and the Vout pin of the voltage detection unit 442.

The resistor 442f is connected to the resistor 442h and the +3.3 V pin of the voltage detection unit 442.

Figure 17:
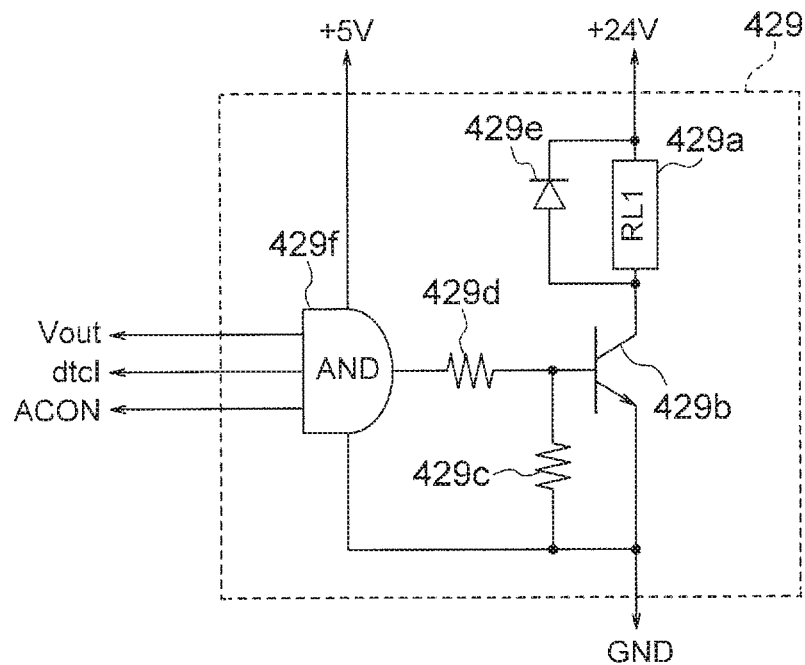
FIG. 17 is a circuit diagram showing an example of a protection operation unit in the fourth embodiment.

FIG. 17 is a circuit diagram showing an example of the protection operation unit 429 in the fourth embodiment.

The protection operation unit 429 includes a relay coil part 429a, a transistor 429b, a resistor 429c, a resistor 429d, a diode 429e and an AND circuit 429f.

A magnetic circuit is formed between the relay coil part 429a and the relay contact part 138c, and the relay coil part 429a and the relay contact part 138c function as an electromagnetic relay.

The relay coil part 429a is connected to the cathode of the diode 429e and a +24 V pin of the protection operation unit 429.

Further, the relay coil part 429a is connected to the anode of the diode 429e and the collector of the transistor 429b.

The base of the transistor 429b is connected to the resistor 429d and the resistor 429c.

The emitter of the transistor 429b is connected to the resistor 429c, a GND pin of the AND circuit 429f, and the GND pin of the protection operation unit 429.

The resistor 429d is connected to an output pin of the AND circuit 429f.

Input pins of the AND circuit 429f are respectively connected to the Vout pin of the voltage detection unit 442, a dtcI pin of the protection operation unit 429 and an ACON pin of the heater temperature control unit 283.

Next, the operation in the fourth embodiment will be described below.

In the second embodiment or the third embodiment, even when the voltage inputted to the low-voltage power supply 210, 310 temporarily turns to AC 0 V owing to instantaneous power interruption, the DC detection unit 230 outputs the H level, and thus there is a possibility of erroneously activating the protection operation unit 229 and blowing the fuse C 138a. Therefore, it was necessary to consider the duration time of the instantaneous power interruption, by increasing the time constant of the resistor 230e and the capacitor 230d of the DC detection unit 230 so as to delay the time when the switching from the L level to the H level occurs. In other words, the H level is outputted when DC power is inputted for a predetermined period.

In the fourth embodiment, the voltage detection unit 442 is added, and at the time of instantaneous power interruption, the L level is outputted from the voltage detection unit 442 and inputted to the protection operation unit 429 so that the protection operation unit 429 does not operate.

The operation of the voltage detection unit 442 will be described below with reference to FIG. 16.

When AC voltage is inputted to the low-voltage power supply 410, the AC voltage is similarly inputted also to the IN5 pin and the IN6 pin of the voltage detection unit 442. When the AC voltage is inputted to the input side of the step-down transformer 442a, stepped-down AC voltage is outputted from the output side of the step-down transformer 442a.

This AC voltage is rectified by the bridge diode 442b and smoothed by the capacitor 442c. Owing to the rectified and smoothed voltage, base current flows into the transistor 442e via the resistor 442d.

Collector current flows from the +3.3 V pin of the voltage detection unit 442 to the transistor 442e via the resistor 442f. Consequently, no current flows into the base of the transistor 442g and no collector current flows from the +3.3 V pin of the voltage detection unit 442 into the transistor 442g via the resistor 442h.

Accordingly, the output from the Vout pin of the voltage detection unit 442, to which current from the +3.3 V pin flows, is set at the H level.

Also when DC voltage is inputted to the low-voltage power supply 410, the above-described operation is performed similarly and the H level is outputted from the voltage detection unit 442.

In contrast, when instantaneous power interruption occurs while AC voltage is inputted to the low-voltage power supply 410, no voltage is inputted to the IN5 pin and the IN6 pin of the voltage detection unit 442, and thus no voltage is inputted to the input side of the step-down transformer 442a, either. In this case, owing to electric charge of the capacitor 442c, discharge current flows into the base of the transistor 442e via the resistor 442d and collector current flows from the +3.3 V pin into the transistor 442e via the resistor 442f.

When the electric charge in the capacitor 442c runs out, the collector current of the transistor 442e stops flowing and current flows from the +3.3 V pin of the voltage detection unit 442 into the base of the transistor 442g via the resistor 442f. Consequently, collector current flows from the +3.3 V pin of the voltage detection unit 442 into the transistor 442g via the resistor 442h and the output from the Vout pin of the voltage detection unit 442 turns to the L level.

When the heater is on and instantaneous power interruption occurs, the ACON signal at the H level, the dtc signal at the H level, and the Vout signal at the L level are inputted to the AND circuit 429f of the protection operation unit 429 shown in FIG. 17, and thus the AND circuit 429f outputs the L level. Accordingly, no base current flows into the transistor 429b and no current flows into the relay coil part 429a.

Since no current flows into the relay coil part 429a, the relay contact part 138c of the heater protection unit 138 shown in FIG. 5 remains off and the varistor 138b of the heater protection unit 138 is not connected between LINE and NEUTRAL. Since LINE and NEUTRAL do not enter the short circuit condition, no short-circuit current flows into the fuse C 138a and the fuse C 138a is not blown.

The fuse C 138a is blown by the protection operation unit 429 when DC power is detected by the DC detection unit 230, the input of voltage is detected by the voltage detection unit 442, and the heater temperature control unit 283 has turned on the heater 22.

As described above, according to the fourth embodiment, even when instantaneous power interruption occurs while the heater 22 is on, the fuse C 138a is not blown and it is possible to continue using the image forming device 400.

In the first to fourth embodiments described above, it is permissible if the heater protection unit 138 is provided on the heater 22's side of the branch point BP; positional relationship of the heater protection unit 138 and the triac 134 may be reversed.

Fifth Embodiment

As shown in FIG. 1, an image forming device 500 according to a fifth embodiment differs from the image forming device 100 according to the first embodiment in a low-voltage power supply 510 and a main control unit 580. The following description will be given mainly of the low-voltage power supply 510 and the main control unit 580.

Figure 18:
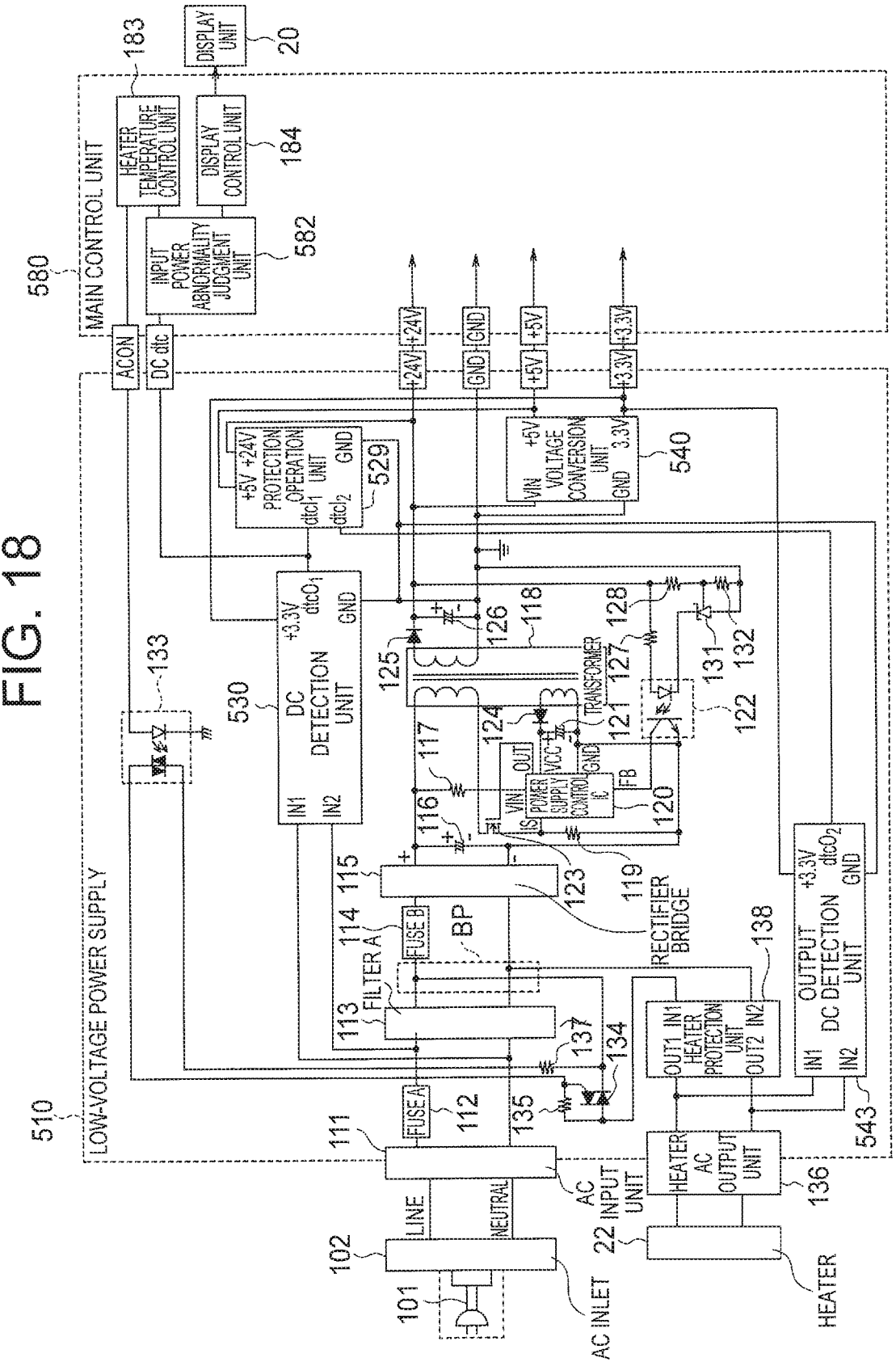
FIG. 18 is a block diagram showing the schematic configuration of a low-voltage power supply and a main control unit in an image forming device according to a fifth embodiment.

FIG. 18 is a block diagram showing the schematic configuration of the low-voltage power supply 510 and the main control unit 580 in the image forming device 500 according to the fifth embodiment.

FIG. 18 shows parts relevant to features of the fifth embodiment, which are extracted from the low-voltage power supply 510 and the main control unit 580.

The power cord 101 is connected to the commercial power supply (AC power supply). The power cord 101 is connected to the AC inlet 102, and the AC inlet 102 is connected to the AC input unit 111 of the low-voltage power supply 510.

The LINE side of the AC input unit 111 is connected to the fuse A 112. The fuse A 112 is connected to the filter A 113 and an IN2 pin of a DC detection unit 530.

The NEUTRAL side of the AC input unit 111 is connected to the filter A 113 and an IN1 pin of the DC detection unit 530.

The filter A 113 is connected to the fuse B 114 and the IN2 pin of the heater protection unit 138.

The fuse B 114 is connected to the input side of the rectifier bridge 115, and the filter A 113 is connected to the input side of the rectifier bridge 115, the triac 134 and the resistor 137.

The + terminal on the output side of the rectifier bridge 115 is connected to the + terminal of the electrolytic capacitor 116, the resistor 117, and the primary side of the transformer 118.

The − terminal on the output side of the rectifier bridge 115 is connected to the − terminal of the electrolytic capacitor 116, the resistor 119, the GND pin of the power supply control IC 120, the − terminal of the electrolytic capacitor 121, the third winding's side of the transformer 118, and the emitter of the photocoupler 122.

The resistor 117 is connected to the VIN pin of the power supply control IC 120.

The source of the FET 123 is connected to the primary side of the transformer 118, the drain of the FET 123 is connected to the resistor 119 and the IS pin of the power supply control IC 120, and the gate of the FET 123 is connected to the OUT pin of the power supply control IC 120.

The third winding's side of the transformer 118 is connected with the anode of the diode 124, and the cathode of the diode 124 is connected to the + terminal of the electrolytic capacitor 121 and the VCC pin of the power supply control IC 120.

The collector of the photocoupler 122 is connected to the FB pin of the power supply control IC 120.

The secondary side of the transformer 118 is connected to the anode of the diode 125, and the cathode of the diode 125 is connected to the + terminal of the electrolytic capacitor 126, the resistor 127, the resistor 128, a +24 V pin of a protection operation unit 529, a VIN pin of a voltage conversion unit 540, and a +24 V output pin of the low-voltage power supply 510.

Further, the secondary side of the transformer 118 is connected to the anode of the variable shunt regulator 131, the − terminal of the electrolytic capacitor 126, the resistor 132, a GND pin of the protection operation unit 529, a GND pin of the DC detection unit 530, and a GND pin of the voltage conversion unit 540, the cathode of the phototriac 133, and a GND output pin of the low-voltage power supply 510.

The anode of the photocoupler 122 is connected to the resistor 127.

The cathode of the photocoupler 122 is connected to the cathode of the variable shunt regulator 131.

The reference pin of the variable shunt regulator 131 is connected to the resistor 128 and the resistor 132.

The phototriac 133 is connected to the gate of the triac 134 and the resistor 135.

Further, the phototriac 133 is connected to the resistor 137.

The resistor 135 is connected to the triac 134 and the IN1 pin of the heater protection unit 138.

The OUT1 pin of the heater protection unit 138 is connected to the heater AC output unit 136 and an IN1 pin of an output DC detection unit 543.

The OUT2 pin of the heater protection unit 138 is connected to the heater AC output unit 136 and an IN2 pin of the output DC detection unit 543.

A +5 V pin of the voltage conversion unit 540 is connected to a +5 V pin of the protection operation unit 529 and a +5 V output pin of the low-voltage power supply 510.

A +3.3 V pin of the voltage conversion unit 540 is connected to a +3.3 V pin of the DC detection unit 530, a +3.3 V pin of the output DC detection unit 543, and a +3.3 V output pin of the low-voltage power supply 510.

A $dtcO_1$ pin of the DC detection unit 530 is connected to a $dtcI_1$ pin of the protection operation unit 529, and is connected via the DC dtc connector to an input power abnormality judgment unit 582 in the main control unit 580.

The output of the input power abnormality judgment unit 582 is inputted to the heater temperature control unit 183 and the display control unit 184.

The display control unit 184 is connected to the display unit 20.

A control signal (ACON signal) of the heater temperature control unit 183 is inputted via the ACON connector to an anode pin of the light-emitting diode of the phototriac 133.

A cathode pin of the light-emitting diode of the phototriac 133 is connected to GND.

Multiple levels of voltages (+24 V, +5 V, +3.3 V, GND) existing in the main control unit 580 are supplied to circuits in the main control unit 580.

Here, the electric wire connected to the IN2 pin of the heater protection unit 138 is connected to the electric wire between the filter A 113 and the fuse B 114, and the electric wire connected to the IN1 pin of the heater protection unit 138 is connected to the electric wire between the filter A 113 and the rectifier bridge 115 via the triac 134.

Put another way, in the image forming device 500, voltage from the commercial power supply is inputted to the AC inlet 102, the input voltage as the voltage inputted to the AC inlet 102 is converted into desired voltage, and there are a first path supplying and inputting the desired voltage to the main control unit 580 and a second path branching off from the first path at the branch point BP and supplying the input voltage to the heater 22. The heater 22, the triac 134 and the heater protection unit 138 are connected in series in the second path.

Figure 19:
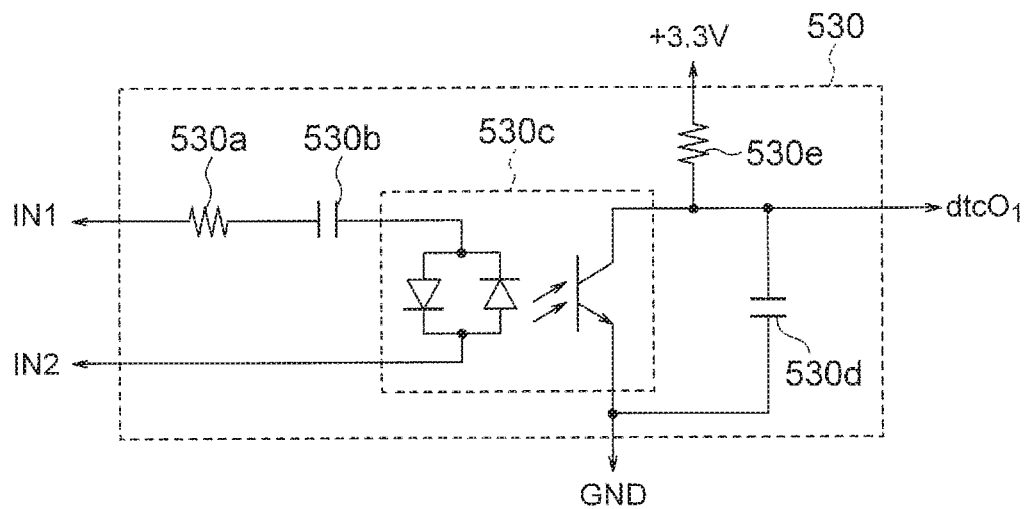
FIG. 19 is a circuit diagram showing an example of a DC detection unit in the fifth embodiment.

FIG. 19 is a circuit diagram showing an example of the DC detection unit 530 in the fifth embodiment.

The DC detection unit 530 includes a resistor 530a, a capacitor 530b, a photocoupler 530c, a capacitor 530d and a resistor 530e.

The resistor 530a is connected to the IN1 pin of the DC detection unit 530.

Further, the resistor 530a is connected to the capacitor 530b.

The capacitor 530b is connected to the photocoupler 530c.

The photocoupler 530c is connected to the IN2 pin of the DC detection unit 530.

Further, the collector of the photocoupler 530c is connected to the resistor 530e, the capacitor 530d and the $dtcO_1$ pin of the DC detection unit 530.

Furthermore, the emitter pin of the photocoupler 530c is connected to the GND pin of the DC detection unit 530 and the capacitor 530d.

Figure 20:
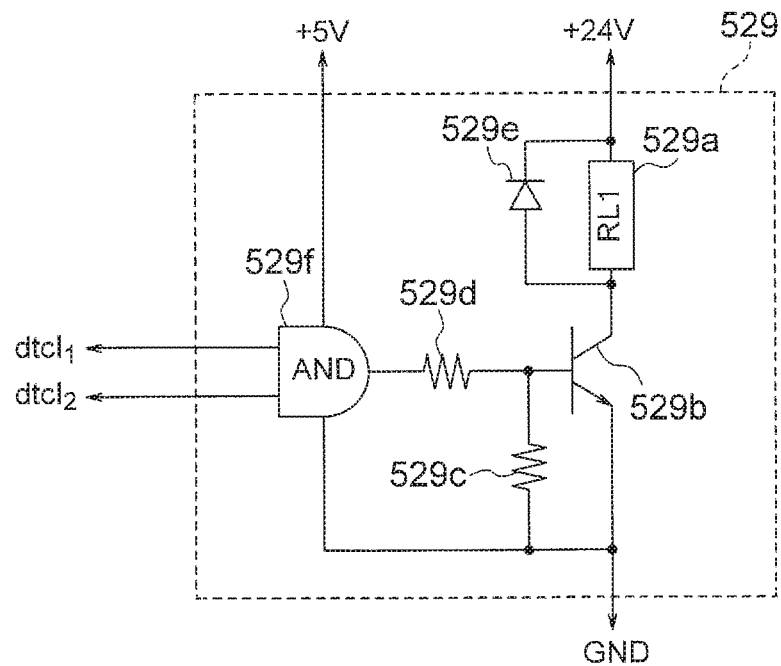
FIG. 20 is a circuit diagram showing an example of a protection operation unit in the fifth embodiment.

FIG. 20 is a circuit diagram showing an example of the protection operation unit 529 in the fifth embodiment.

The protection operation unit 529 includes a relay coil part 529a, a transistor 529b, a resistor 529c, a resistor 529d, a diode 529e and an AND circuit 529f.

A magnetic circuit is formed between the relay coil part 529a and the relay contact part 138c, and the relay coil part 529a and the relay contact part 138c function as an electromagnetic relay.

The relay coil part 529a is connected to the cathode of the diode 529e and the +24 V pin of the protection operation unit 529.

Further, the relay coil part 529a is connected to the anode of the diode 529e and the collector of the transistor 529b.

The base of the transistor 529b is connected to the resistor 529d and the resistor 529c.

The emitter of the transistor 529b is connected to the resistor 529c, a GND pin of the AND circuit 529f, and the GND pin of the protection operation unit 529.

The resistor 529d is connected to an output pin of the AND circuit 529f.

Input pins of the AND circuit 529f are respectively connected to the $dtcI_1$ pin and a $dtcI_2$ pin of the protection operation unit 529.

Figure 21:
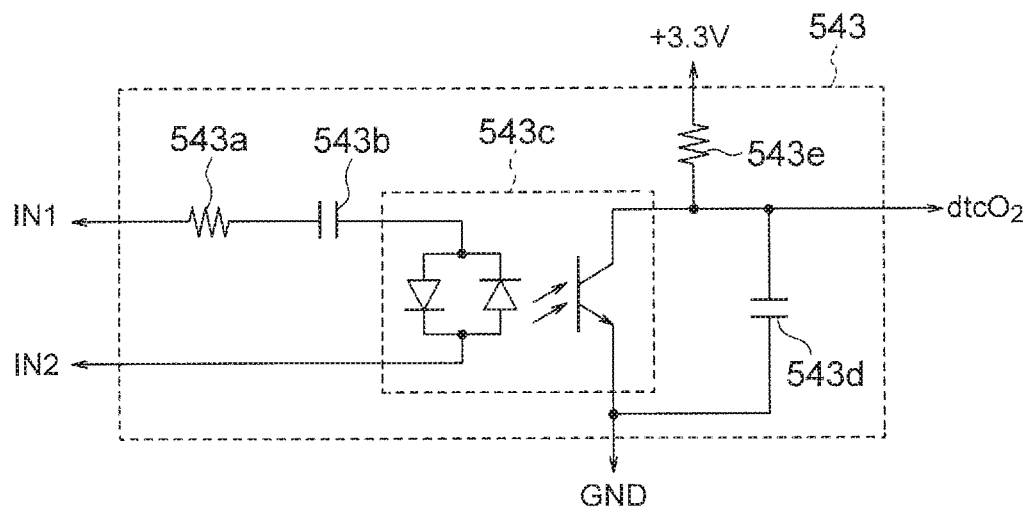
FIG. 21 is a circuit diagram showing an example of an output DC detection unit in the fifth embodiment.

FIG. 21 is a circuit diagram showing an example of the output DC detection unit 543 in the fifth embodiment.

The output DC detection unit 543 includes a resistor 543a, a capacitor 543b, a photocoupler 543c, a capacitor 543d and a resistor 543e.

The resistor 543a is connected to the IN1 pin of the output DC detection unit 543.

Further, the resistor 543a is connected to the capacitor 543b.

The capacitor 543b is connected to the photocoupler 543c.

The photocoupler 543c is connected to the IN2 pin of the output DC detection unit 543.

The collector of the photocoupler 543c is connected to the resistor 543e, the capacitor 543d and a $dtcO_2$ pin of the output DC detection unit 543.

The emitter of the photocoupler 543c is connected to a GND pin of the output DC detection unit 543 and the capacitor 543d.

The output DC detection unit 543 functions as an output abnormality detection unit that detects abnormality in the input voltage outputted to the heater 22. The output DC detection unit 543 detects abnormality when the input voltage is DC voltage.

Part or all of the input power abnormality judgment unit 582, the heater temperature control unit 183 and the display control unit 184 of the main control unit 580 described above can be implemented by a memory 30 and a processor 31 such as a CPU for executing a program stored in the memory 30 as shown in FIG. 6A, for example. Such a program may be provided via a network, or provided in the form of being stored in a record medium. Namely, such a program may be provided as a program product, for example.

Part or all of the input power abnormality judgment unit 582, the heater temperature control unit 183 and the display control unit 184 of the main control unit 580 are also implemented by a processing circuit 32 such as a single circuit, a combined circuit, a programmed processor, a parallelly programmed processor, an ASIC or an FPGA as shown in FIG. 6B, for example.

Incidentally, the heater temperature detection unit 286 can be implemented by a sensor that detects the temperature of the heater 22.

Next, the operation in the fifth embodiment will be described below.

The ON and OFF switching of the heater 22 is performed by turning the triac 134 on or off with the ACON signal as the output signal from the heater temperature control unit 183 of the main control unit 580.

As mentioned earlier, when DC power is inputted, the triac 134 is incapable of turning off, the ON state continues, and the heater 22 remains on.

As described in the first embodiment, irrespective of whether AC power is supplied from the electric power supply side or DC power is supplied from the supplier as the commercial power supply owing to an accident or the like on the electric power supply side, for example, the main control unit 580 is capable of obtaining stepped-down DC voltage and thus is capable of executing the process.

First, the operation when the heater 22 is in the ON state will be described.

When DC power is supplied to the low-voltage power supply 510, the supplied DC power is inputted to the IN1 pin or the IN2 pin of the DC detection unit 530 through the AC input unit 111 and the fuse A 112 of the low-voltage power supply 510.

When the DC power is supplied to the DC detection unit 530, the output from the dtcO$_1$ pin of the DC detection unit 530 turns to the H level. This is the same as in the first embodiment.

The DC detection unit 530 functions as the input abnormality detection unit that detects abnormality in the input voltage as the voltage inputted from the commercial power supply. The DC detection unit 530 detects abnormality when the input voltage is DC voltage.

When the H level is outputted as the ACON signal of the heater temperature control unit 183, the light-emitting diode of the phototriac 133 turns on and the triac 134 turns on. The DC power supplied from the commercial power supply is inputted to the heater AC output unit 136 and the IN1 pin of the output DC detection unit 543 through the AC input unit 111, the fuse A 112, the filter A 113, the triac 134 and the heater protection unit 138 of the low-voltage power supply 510.

When the DC power is supplied to the output DC detection unit 543, the output from the dtcO$_2$ pin of the output DC detection unit 543 turns to the H level.

Specifically, when the DC power is supplied to the IN1 pin of the output DC detection unit 543, voltage is applied to the resistor 543a as shown in FIG. 21; however, the DC power is interrupted by the capacitor 543b and no current flows into the output DC detection unit 543. Thus, the photocoupler 543c does not operate and current inputted through the +3.3 V pin is outputted from the dtcO$_2$ pin and its output signal turns to the H level.

Since the dtcO$_2$ pin is connected to the dtcI$_2$ pin of the protection operation unit 529, the input to the dtcI$_2$ pin of the protection operation unit 529 shown in FIG. 20 turns to the H level.

In this case, the input signals to the AND circuit 529f of the protection operation unit 529 are both at the H levels, and thus the output from the AND circuit 529f is set at the H level. Accordingly, current flows into the base of the transistor 529b via the resistor 529d and current flows into the relay coil part 529a of the protection operation unit 529.

When the current flows into the relay coil part 529a, the relay contact part 138c of the heater protection unit 138 shown in FIG. 5 turns on. In this case, the varistor 138b of the heater protection unit 138 is connected between LINE and NEUTRAL. If a varistor whose varistor voltage is 80 V, for example, is used as the varistor 138b, LINE and NEUTRAL turn to the short circuit condition when the supply voltage rises to 80 V or higher. When short-circuit current flows into the fuse C 138a of the heater protection unit 138, the fuse C 138a is blown and the supply of voltage to the heater 22 becomes impossible. By the above-described operation, the heater 22 can be stopped safely.

By the protection operation 529, the fuse C 138a is blown when DC power is detected by the DC detection unit 530 and DC power is detected by the output DC detection unit 543.

Next, the operation when the heater 22 is in the OFF state will be described.

When DC power is supplied to the low-voltage power supply 510, the supplied DC power is inputted to the IN1 pin or the IN2 pin of the DC detection unit 530 through the AC input unit 111 and the fuse A 112 of the low-voltage power supply 510. When the DC power is supplied to the DC detection unit 530, the output from the dtcO$_1$ pin of the DC detection unit 530 turns to the H level. This is the same as in the first embodiment.

When the heater 22 is in the OFF state, the L level is outputted from the ACON pin of the heater temperature control unit 183. Thus, the light-emitting diode of the phototriac 133 is set to off and the triac 134 is set to the open state. Accordingly, no current flows into the heater 22.

Since no DC power is supplied to the output DC detection unit 543, the output from the dtcO$_2$ pin of the output DC detection unit 543 is set at the H level.

Specifically, since no DC power is supplied to the IN1 pin, no current flows into the output DC detection unit 543 and the photocoupler 543c does not operate. Since the photocoupler 543c does not operate, current inputted through the +3.3 V pin is outputted from the dtcO$_2$ pin and its output is set at the H level.

Since the input signals to the AND circuit 529f of the protection operation unit 529 shown in FIG. 20 are both at the H levels, the AND circuit 529f outputs the H level. Current flows into the base of the transistor 529b via the resistor 529d and current flows into the relay coil part 529a of the protection operation unit 529.

When the current flows into the relay coil part 529a, the relay contact part 138c of the heater protection unit 138 shown in FIG. 5 turns on. The varistor 138b of the heater protection unit 138 is connected between LINE and NEUTRAL, and LINE and NEUTRAL turn to the short circuit condition; however, the fuse C 138a is not blown since no short-circuit current flows into the fuse C 138a.

Figure 22:
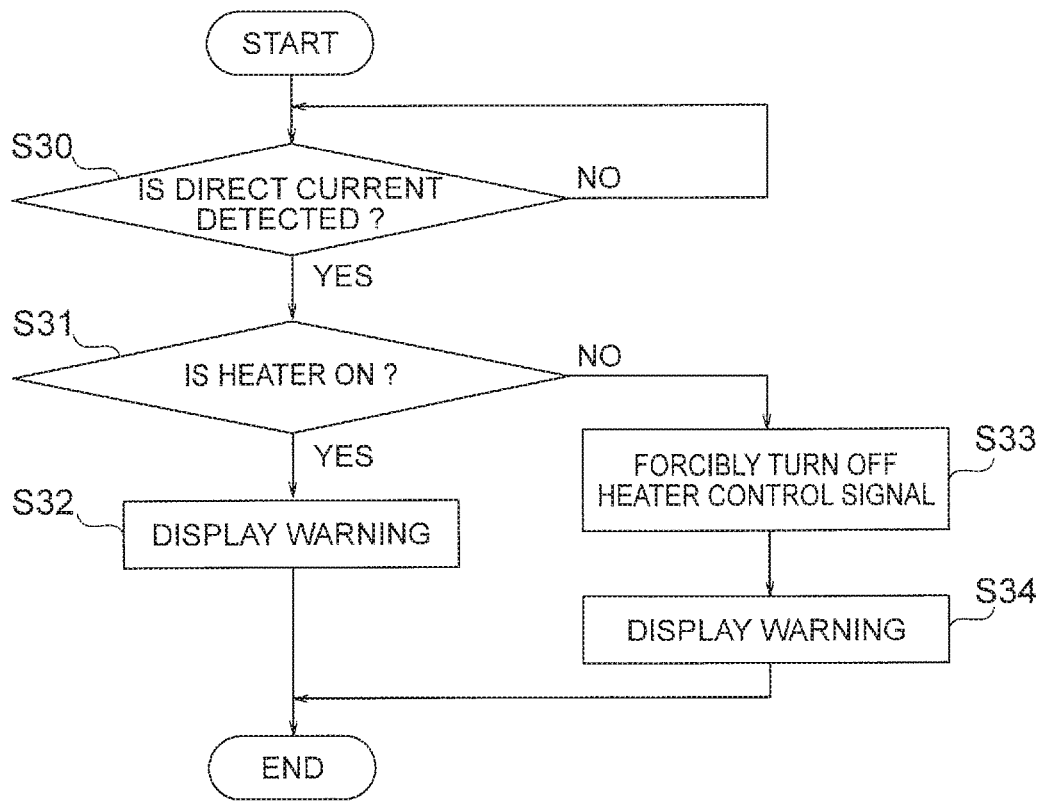
FIG. 22 is a flowchart showing the operation of an input power abnormality judgment unit in the fifth embodiment.

FIG. 22 is a flowchart showing the operation of the input power abnormality judgment unit 582 in the fifth embodiment.

The input power abnormality judgment unit 582 judges whether the DC detection unit 530 has detected direct current or not, based on the output from the dtcO$_1$ pin of the DC detection unit 530 (S30). When direct current is detected (Yes in S30), the process proceeds to step S31.

In the step S31, the input power abnormality judgment unit 582 judges whether or not the heater 22 is on or not, based on the output from the heater temperature control unit 183. When the heater 22 is on (Yes in S31), the process proceeds to step S32. When the heater 22 is off (No in S31), the process proceeds to step S33.

In the step S32, the input power abnormality judgment unit 582 commands the display control unit 184 to display a warning on the display unit 20. Here, the display unit 20 displays the message "Power supply input abnormality: direct current was detected. Heater protection circuit operated. Call serviceperson.", for example.

In contrast, in the step S33, the input power abnormality judgment unit 582 commands the heater temperature control unit 183 and thereby forcibly turns off the heater control signal. This disables the heater temperature control unit 183 from setting the ACON signal as the output signal to the H level.

Then, the input power abnormality judgment unit 582 commands the display control unit 184 to display a warning on the display unit 20 (S34). Here, the display unit 20 displays the message "Power supply input abnormality: direct current was detected.", for example.

In the fifth embodiment, the DC detection unit 530, the output DC detection unit 543 and the protection operation unit 529 are formed with hardware in consideration of cases where firmware of the input power abnormality judgment unit 582 or the like malfunctions.

For example, when the input power abnormality judgment unit 582 erroneously judges that DC power is inputted irrespective of the actual situation in which the heater 22 is on and AC power is inputted to the low-voltage power supply 510, processing by the firmware erroneously operates the protection operation unit 529 and blows the fuse C 138a of the heater protection unit 138.

In the fifth embodiment, the outputs from the DC detection unit 530 and the output DC detection unit 543 are not at the H levels but at the L levels, and thus the AND circuit 529f of the protection operation unit 529 outputs the L level. Accordingly, the fuse C 138a is not blown.

Further, for example, when the input power abnormality judgment unit 582 erroneously judges that AC power is inputted irrespective of the actual situation in which the heater 22 is on and DC power is inputted to the low-voltage power supply 510, processing by the firmware is incapable of making the protection operation unit 529 operate, the triac 134 remains on, the heater 22 also remains on, and safety is impaired.

In the fifth embodiment, the outputs from the DC detection unit 530 and the output DC detection unit 543 are not at the L levels but at the H levels, and thus the AND circuit 529f of the protection operation unit 529 outputs the H level. Accordingly, the fuse C 138a is blown and the heater 22 can be protected.

As described above, according to the fifth embodiment, the heater 22 can be stopped safely even when the triac 134 is disabled from performing the OFF control of the heater 22 by the supply of DC power owing to an accident or the like on the supply side.

Further, when DC power is supplied while the heater 22 is off, the ACON signal as the heater control signal from the heater temperature control unit 183 is prevented from turning to the H level, and thus the heater 22 can be protected before the triac 134 is disabled from performing the OFF control of the heater 22 owing to the supply of DC power, the fuse C 138a is not blown, and the heater 22 can be stopped safely.

Furthermore, even when DC power is supplied while the heater 22 is on and the heater temperature control unit 183 turns off the ACON signal as the heater control signal and the triac 134 is disabled from performing the OFF control of the heater 22 while the input power abnormality judgment unit 582 detects the DC detection signal dtc from the DC detection unit 530, the fuse C 138a of the heater protection unit 138 is operated owing to the AND condition of the DC detection signal from the DC detection unit 530 and the DC detection signal from the output DC detection unit 543, by which the heater 22 can be forcibly turned off and the heater 22 can be stopped more safely.

Incidentally, while the fifth embodiment is configured as shown in FIG. 20 to blow the fuse C 138a when the DC detection signal (input DC detection signal) at the DC detection unit 530 and the DC detection signal (output DC detection signal) at the output DC detection unit 543 are both indicating the detection of DC power (both at the H levels), the fifth embodiment is not limited to such an example.

For example, the fifth embodiment may be configured to blow the fuse C 138a when DC power is detected by the output DC detection unit 543. This is because DC power is detected by the output DC detection unit 543 when DC power is inputted to the low-voltage power supply 510 and the heater 22 has been set to on. In such cases, the fifth embodiment may be configured so that the detection signal from the output DC detection unit 543 is inputted to the base of the transistor 529b via the resistor 529d in FIG. 20.

In the fifth embodiment described above, it is permissible if the heater protection unit 138 is provided on the heater 22's side of the branch point BP; positional relationship of the heater protection unit 138 and the triac 134 may be reversed.

However, the output DC detection unit 543 needs to be arranged on the heater 22's side of the triac 134.

Incidentally, in cases where the triac 134, the heater protection unit 138, the output DC detection unit 543 and the heater 22 are arranged in this order from the branch point BP as shown in FIG. 18, the blown state of the fuse C 138a can also be detected based on the signal outputted from the output DC detection unit 543.

In contrast, in cases where the triac 134, the output DC detection unit 543, the heater protection unit 138 and the heater 22 are arranged in this order from the branch point BP, the input of DC power to the low-voltage power supply 510 can be detected based on the signal outputted from the output DC detection unit 543 even after the fuse C 138a is blown.

Sixth Embodiment

As shown in FIG. 1, an image forming device 600 according to a sixth embodiment differs from the image forming device 100 according to the first embodiment in a low-voltage power supply 610 and a main control unit 680. The following description will be given mainly of the low-voltage power supply 610 and the main control unit 680.

Figure 23:
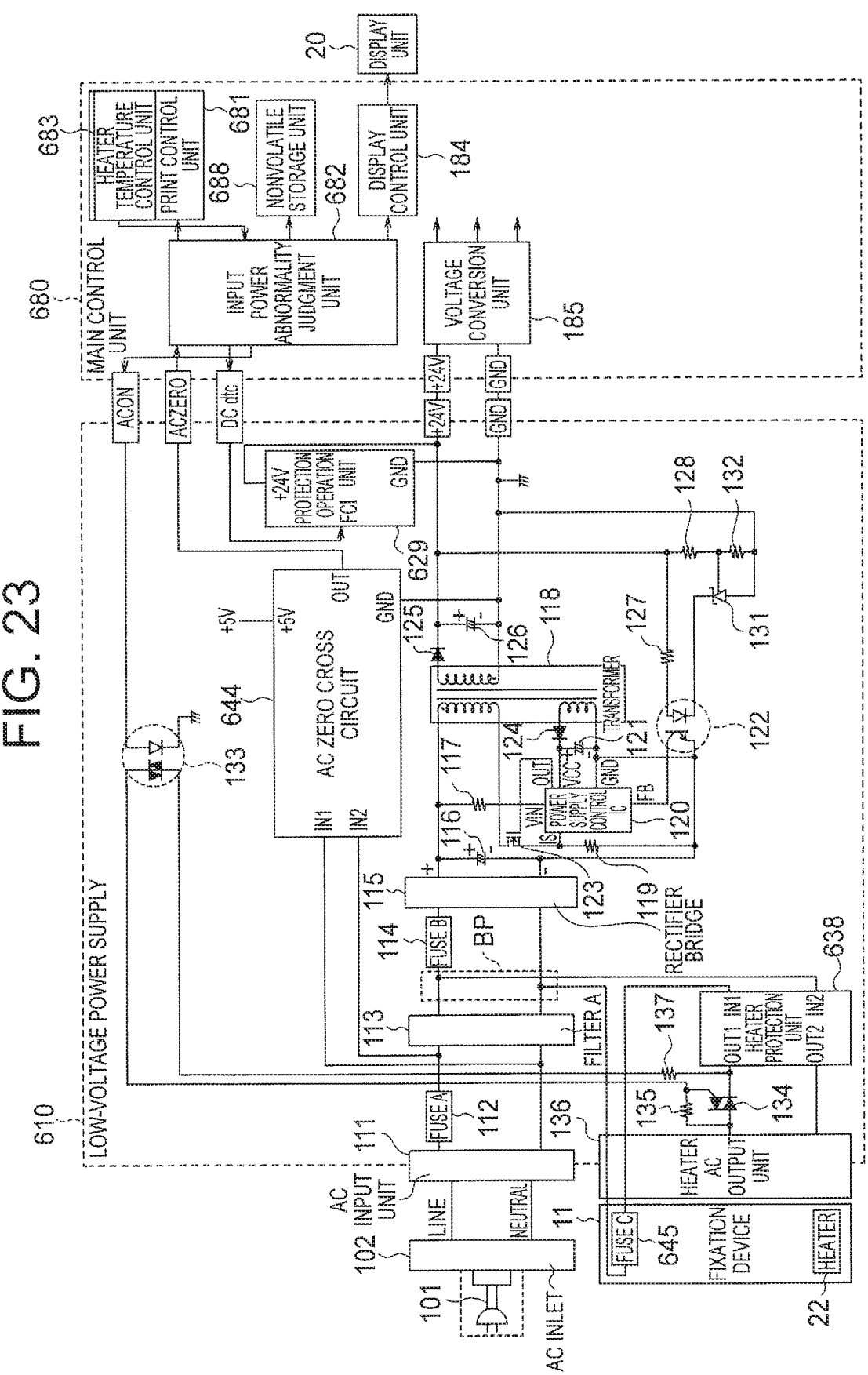
FIG. 23 is a block diagram showing the schematic configuration of a low-voltage power supply and a main control unit in an image forming device according to a sixth embodiment.

FIG. 23 is a block diagram showing the schematic configuration of the low-voltage power supply 610 and the main control unit 680 in the image forming device 600 according to the sixth embodiment.

FIG. 23 shows parts relevant to features of the sixth embodiment, which are extracted from the low-voltage power supply 610 and the main control unit 680.

The power cord 101 is connected to the commercial power supply (AC power supply). The power cord 101 is connected to the AC inlet 102, and the AC inlet 102 is connected to the AC input unit 111 of the low-voltage power supply 610.

The LINE side of the AC input unit 111 is connected to the fuse A 112. The fuse A 112 is connected to the filter A 113 and an IN2 pin of an AC zero cross circuit 644.

The NEUTRAL side of the AC input unit 111 is connected to the filter A 113 and an IN1 pin of the AC zero cross circuit 644.

The filter A 113 is connected to the fuse B 114 and an IN2 pin of a heater protection unit 638.

The fuse B 114 is connected to the input side of the rectifier bridge 115, and the filter A 113 is connected to the input side of the rectifier bridge 115 and to an IN1 pin of the heater protection unit 638 via a fuse C 645.

The + terminal on the output side of the rectifier bridge 115 is connected to the + terminal of the electrolytic capacitor 116, the resistor 117, and the primary side of the transformer 118.

The − terminal on the output side of the rectifier bridge 115 is connected to the − terminal of the electrolytic capacitor 116, the resistor 119, the GND pin of the power supply control IC 120, the − terminal of the electrolytic capacitor 121, the third winding's side of the transformer 118, and the emitter of the photocoupler 122.

The resistor 117 is connected to the VIN pin of the power supply control IC 120.

The source of the FET 123 is connected to the primary side of the transformer 118, the drain of the FET 123 is connected to the resistor 119 and the IS pin of the power supply control IC 120, and the gate of the FET 123 is connected to the OUT pin of the power supply control IC 120.

The third winding's side of the transformer 118 is connected with the anode of the diode 124, and the cathode of the diode 124 is connected to the + terminal of the electrolytic capacitor 121 and the VCC pin of the power supply control IC 120.

The collector of the photocoupler 122 is connected to the FB pin of the power supply control IC 120.

The secondary side of the transformer 118 is connected to the anode of the diode 125, and the cathode of the diode 125 is connected to the + terminal of the electrolytic capacitor 126, the resistor 127, the resistor 128, a +24 V pin of a protection operation unit 629, and a +24 V output pin of the low-voltage power supply 610.

The secondary side of the transformer 118 is connected to the anode of the variable shunt regulator 131, the − terminal of the electrolytic capacitor 126, the resistor 132, a GND pin of the protection operation unit 629, a GND pin of the AC zero cross circuit 644, and a GND output pin of the low-voltage power supply 610.

The anode of the photocoupler 122 is connected to the resistor 127.

The cathode of the photocoupler 122 is connected to the cathode of the variable shunt regulator 131.

The reference pin of the variable shunt regulator 131 is connected to the resistor 128 and the resistor 132.

The phototriac 133 is connected to the gate of the triac 134 and the resistor 135.

Further, the phototriac 133 is connected to the resistor 137.

The resistor 135 is connected to the triac 134 and the heater AC output unit 136.

The OUT2 pin of the heater protection unit 638 is connected to the heater AC output unit 136.

The triac 134 is connected to the resistor 137 and an OUT1 pin of the heater protection unit 638.

Further, the triac 134 is connected to the heater AC output unit 136.

The GND pin of the AC zero cross circuit 644 is connected to a GND pin of the low-voltage power supply 610.

An OUT pin of the AC zero cross circuit 644 outputs an AC zero cross signal to the main control unit 680 via an ACZERO connector.

Although not illustrated, +5 V generated by a DC-DC converter from the +24 V supply power is inputted to a +5 V pin of the AC zero cross circuit 644.

The main control unit 680 is a control board that controls the image forming device 600.

The voltage conversion unit 185 generates multiple levels of supply power (3.3 V, 1.8 V, etc.) to be used by the logic or the like of the control board from +24 V or +5 V inputted through a +24 V input pin or a +5 V input pin of the main control unit 680 by using a DC-DC conversion circuit.

The display control unit 184 makes a display device of the display unit 20 show various types of displays.

A nonvolatile storage unit 688 stores error information.

A print control unit 681 controls the image formation (printing) performed by the image forming device 600.

The print control unit 681 includes a heater temperature control unit 683.

The output from the heater temperature control unit 683, which is the heater control signal (ACON signal), first enters an input power abnormality judgment unit 682, and is inputted from the input power abnormality judgment unit 682 to the phototriac 133 via the ACON connector.

The input power abnormality judgment unit 682 outputs a fuse cut signal (FC signal) via an FC connector, and the FC signal is inputted to an FCI pin of the protection operation unit 629.

The AC zero cross signal outputted from the OUT pin of the AC zero cross circuit 644 is inputted to the input power abnormality judgment unit 682 via the ACZERO connector. The AC zero cross signal is used by the print control unit 681 for heater phase control in a countermeasure against flicker in cases where the heater 22 of the fixation device 11 is a halogen lamp.

Here, an electric wire connected to the IN2 pin of the heater protection unit 638 is connected to the electric wire between the filter A 113 and the fuse B 114, and an electric wire connected to the IN1 pin of the heater protection unit 638 is connected to the electric wire between the filter A 113 and the rectifier bridge 115.

Put another way, in the image forming device 600, voltage from the commercial power supply is inputted to the AC inlet 102, the input voltage as the voltage inputted to the AC inlet 102 is converted into desired voltage, and the desired voltage passes through a first path supplying and inputting the desired voltage to the main control unit 680 and a second path branching off from the first path at the branch point BP and supplying the input voltage to the heater 22. The heater 22, the triac 134, the fuse C 645 and the heater protection unit 138 are connected in series in the second path.

Figure 24:
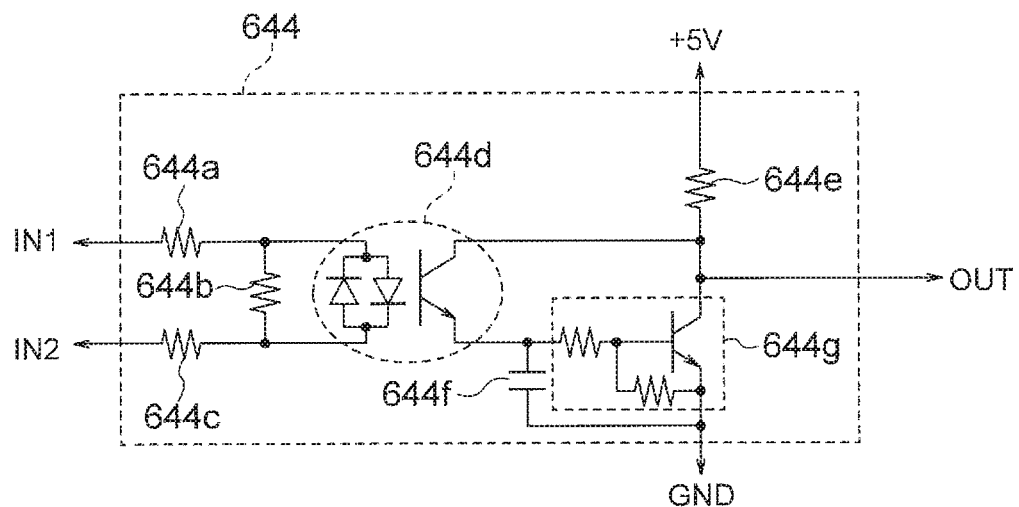
FIG. 24 is a circuit diagram showing an example of an AC zero cross circuit in the sixth embodiment.

FIG. 24 is a circuit diagram showing an example of the AC zero cross circuit 644 in the sixth embodiment.

The AC zero cross circuit 644 includes a resistor 644a, a resistor 644b, a resistor 644c, a photocoupler 644d, a resistor 644e, a capacitor 644f and a digital transistor 644g.

The resistor 644a is connected to the IN1 pin of the AC zero cross circuit 644.

Further, the resistor 644a is connected to the resistor 644b and the photocoupler 644d.

The resistor 644c is connected to the IN2 pin of the AC zero cross circuit 644.

Further, the resistor 644c is connected to the resistor 644b and the photocoupler 644d.

The photocoupler 644d is connected to the resistor 644e.

Further, the photocoupler 644d is connected to the capacitor 644f and the base of the digital transistor 644g.

The resistor 644e is connected to the +5 V pin of the AC zero cross circuit 644.

The emitter of the digital transistor 644g is connected to the GND pin of the AC zero cross circuit 644, and the collector of the digital transistor 644g is connected to the OUT pin of the AC zero cross circuit 644.

Incidentally, there exist some different circuit configurations for the AC zero cross circuit 644. AC zero cross circuits different from the above-described configuration may also be employed for the sixth embodiment.

Here, the AC zero cross circuit 644 functions as an AC zero cross detection unit that detects AC zero cross points of the input voltage.

Figure 25:
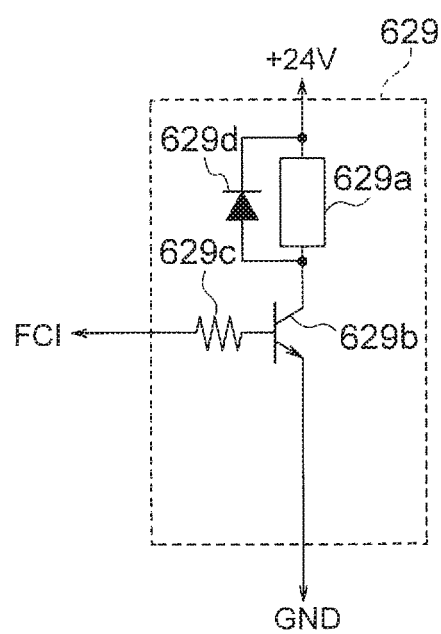
FIG. 25 is a circuit diagram showing an example of a protection operation unit in the sixth embodiment.

FIG. 25 is a circuit diagram showing an example of the protection operation unit 629 in the sixth embodiment.

The protection operation unit 629 includes a relay coil part 629*a*, a transistor 629*b*, a resistor 629*c* and a diode 629*d*.

The relay coil part 629*a* is connected to the cathode of the diode 629*d* and the +24 V pin of the protection operation unit 629.

Further, the relay coil part 629*a* is connected to the anode of the diode 629*d* and the collector of the transistor 629*b*.

The base of the transistor 629*b* is connected to the resistor 629*c*.

The resistor 629*c* is connected to the FCI pin of the protection operation unit 629.

Figure 26:
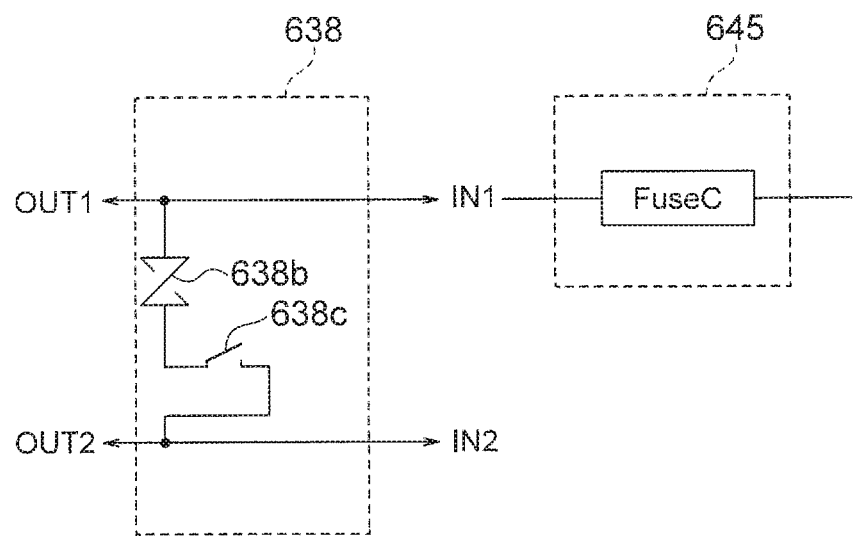
FIG. 26 is a circuit diagram showing an example of a heater protection unit in the sixth embodiment.

FIG. 26 is a circuit diagram showing an example of the heater protection unit 638 in the sixth embodiment.

The heater protection unit 638 includes a varistor 638*b* and a relay contact part 638*c*.

The varistor 638*b* is connected to the fuse C 645 and the OUT1 pin of the heater protection unit 638.

Further, the varistor 638*b* is connected to the relay contact part 638*c*.

The relay contact part 638*c* is connected to the OUT2 pin and the IN2 pin of the heater protection unit 638.

A magnetic circuit is formed between the relay coil part 629*a* and the relay contact part 638*c*, and the relay coil part 629*a* and the relay contact part 638*c* function as an electromagnetic relay.

Here, the fuse C 645 is provided in the detachable fixation device 11. Incidentally, the fuse C 645 is connected to NEUTRAL and the IN1 pin of the heater protection unit 638 as shown in FIG. 23.

Figure 27:
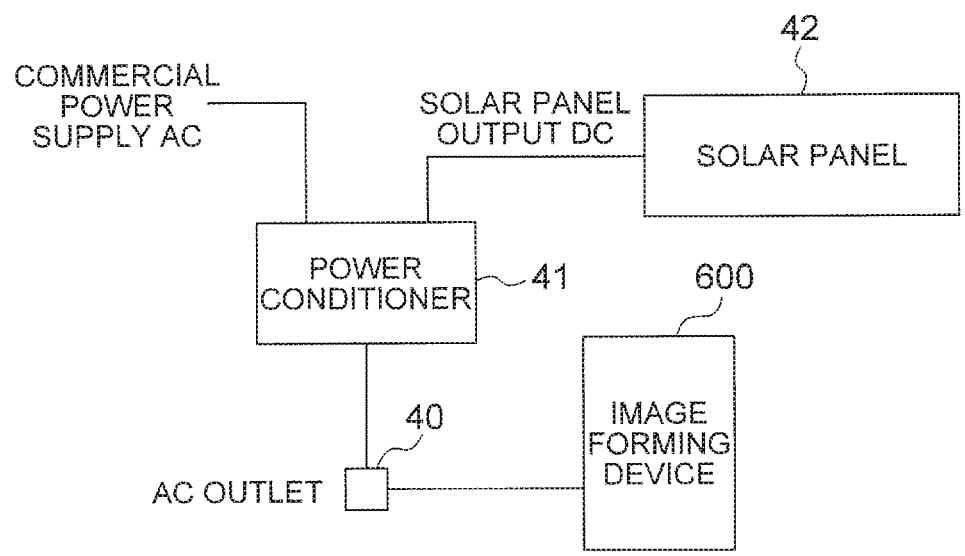
FIG. 27 is a schematic diagram for explaining the system of a commercial power supply.

FIG. 27 is a schematic diagram for explaining the system of the commercial power supply.

The image forming device 600 is connected to a power conditioner 41 via an AC outlet 40.

The power conditioner 41 is connected to the AC outlet 40 from a distribution panelboard via indoor wiring. To the power conditioner 41, AC power from the commercial power supply and DC power from a solar panel 42 are inputted.

Here, if there is wrong with the power conditioner 41, it is possible to presume a case where the DC power from the solar panel 42 flows into the AC outlet 40 and a case where the AC power from the commercial power supply and the DC power from the solar panel 42 are superimposed together.

Figure 28A:
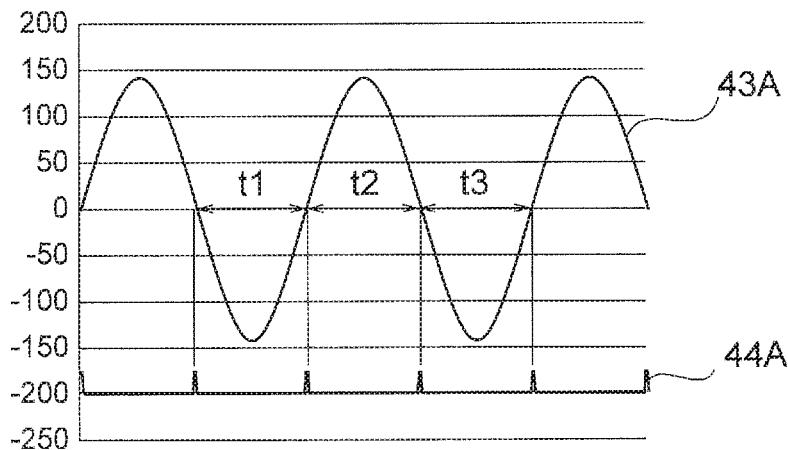
FIGS. 28A to 28C are graphs showing the relationship between an AC zero cross signal and a power supply waveform.
Figure 28B:
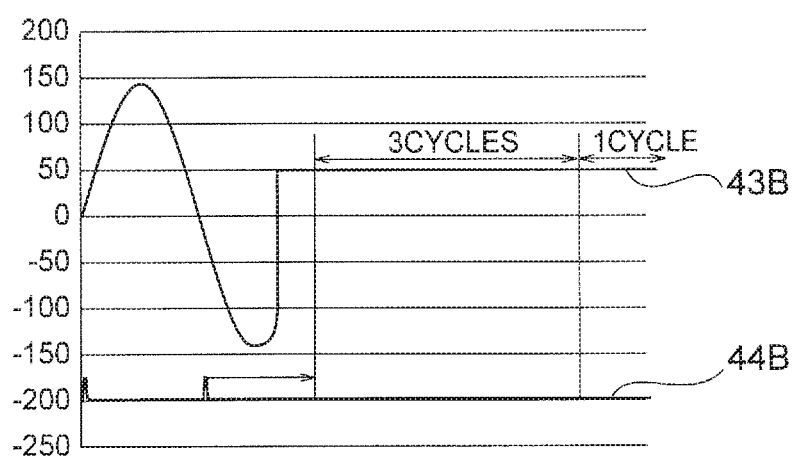
Figure 28C:
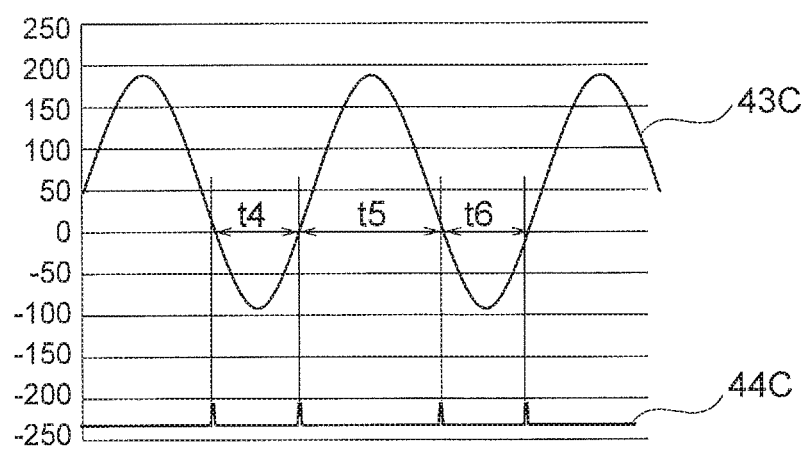

FIGS. 28A to 28C are graphs showing the relationship between the AC zero cross signal and a power supply waveform.

In the graphs shown in FIGS. 28A to 28C, the horizontal axis represents the time and the vertical axis represents the voltage value. However, the AC zero cross signals in FIGS. 28A to 28C are shown for the purpose of comparison with the power supply waveform, and are irrelevant to the voltage values on the vertical axis.

FIG. 28A shows the power supply waveform 43A in AC100V/50 Hz inputted to the low-voltage power supply 610 and the AC zero cross signal 44A in regard to the power supply waveform 43A. As shown in FIG. 28A, the periods (t1, t2, t3) at which the AC zero cross signal turns to the H level are even at 10 ms. Incidentally, AC zero cross points are detected when the AC zero cross signal is at the H level.

FIG. 28B shows the power supply waveform 43B and the AC zero cross signal 44B in regard to the power supply waveform 43B when the input to the low-voltage power supply 610 changes from AC100V/50 Hz to DC50V. As shown in FIG. 28B, when the input from the power supply switches to DC, the output of the H level as the AC zero cross signal stops. Incidentally, although not illustrated, when the instantaneous power interruption continues for 1 cycle (20 ms in this example), the H level of the AC zero cross signal is outputted after the instantaneous power interruption. In the sixth embodiment, the image forming device 600 is assumed to stop the operation owing to a drop in supply power on the secondary side of the image forming device 600 when the instantaneous power interruption continues for 3 cycles.

FIG. 28C shows the power supply waveform 43C and the AC zero cross signal 44C in regard to the power supply waveform 43C when DC50V is superimposed on AC100V/50 Hz as the input to the low-voltage power supply 610. In this case, as indicated by t4, t5 and t6 in FIG. 28C, the periods of the AC zero cross signal 44C repeatedly becomes short, long, short, long, and so forth. For example, when the frequency of the AC power supply is 50 Hz, each of the periods of the AC zero cross signal generally ought to be 10 ms. In contrast, when the phenomenon in which each of the periods of the AC zero cross signal becomes shorter than or equal to 8 ms as short periods and becomes longer than or equal to 12 ms as long periods continues, it is possible to identify that DC is superimposed on AC.

Part or all of the print control unit 681, the input power abnormality judgment unit 682, the heater temperature control unit 683 and the display control unit 184 of the main control unit 680 described above can be implemented by a memory 30 and a processor 31 such as a CPU for executing a program stored in the memory 30 as shown in FIG. 6A, for example. Such a program may be provided via a network, or provided in the form of being stored in a record medium. Namely, such a program may be provided as a program product, for example.

Part or all of the print control unit 681, the input power abnormality judgment unit 682, the heater temperature control unit 683 and the display control unit 184 of the main control unit 680 are also implemented by a processing circuit 32 such as a single circuit, a combined circuit, a programmed processor, a parallelly programmed processor, an ASIC or an FPGA as shown in FIG. 6B, for example.

Incidentally, the nonvolatile storage unit 688 can be formed with a nonvolatile memory such as an EEPROM (Electrically Erasable Programmable Read Only Memory) or a flash memory.

Next, the operation in the sixth embodiment will be described below.

Figure 29:
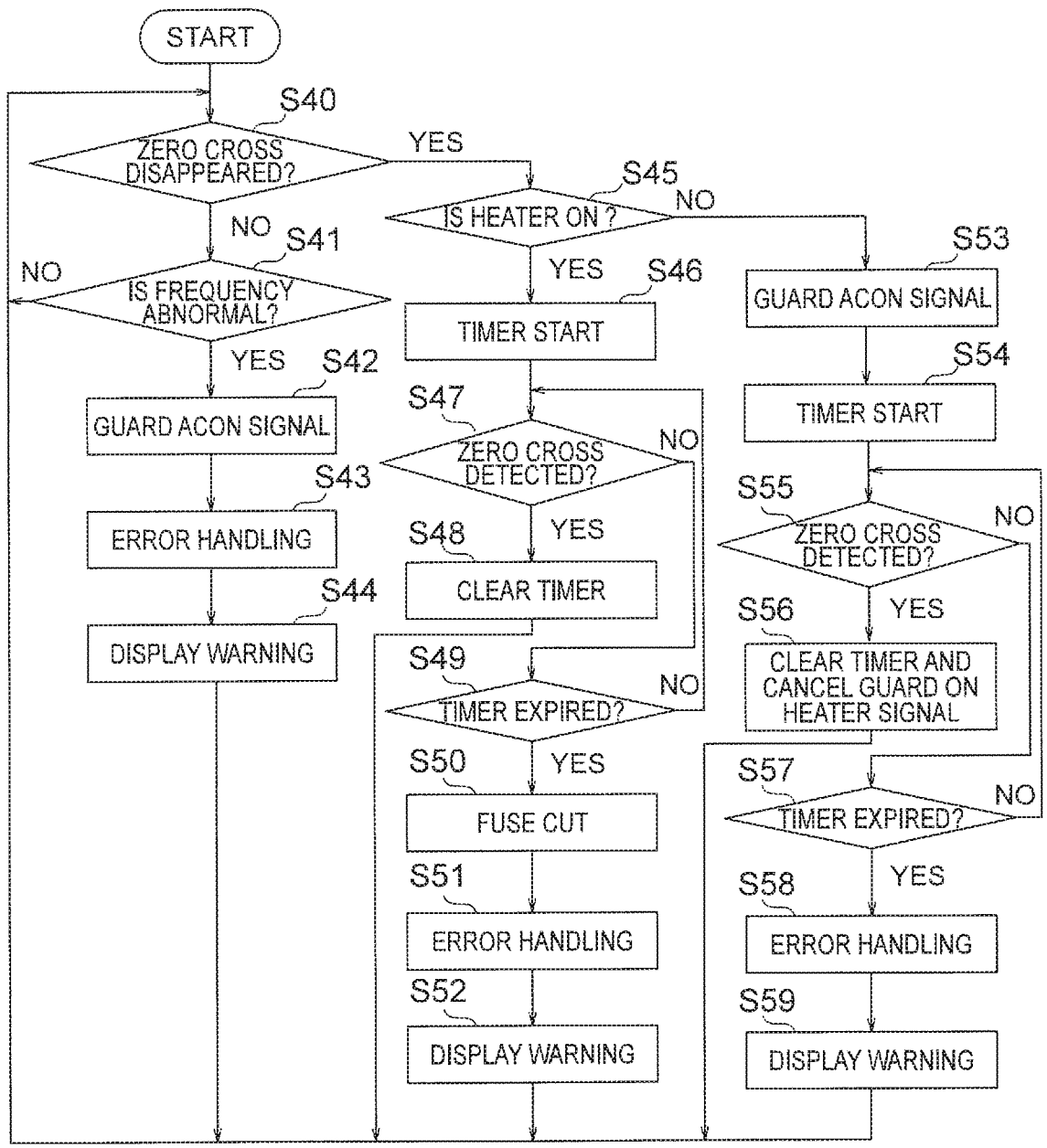
FIG. 29 is a flowchart showing an operation in an input power abnormality judgment unit in the sixth embodiment.

FIG. 29 is a flowchart showing an operation in the input power abnormality judgment unit 682.

First, the input power abnormality judgment unit 682 judges whether or not the AC zero cross points (H level) have disappeared from the AC zero cross signal from the AC zero cross circuit 644 (S40). For example, the input power abnormality judgment unit 682 judges that the AC zero cross points have disappeared if the H level of the AC zero cross signal is not detected for a predetermined time. Here, it is permissible if the predetermined time is selected from a range between the time of one period of the AC zero cross signal (e.g., 10 ms) and the time of two periods of the AC zero cross signal (e.g., 20 ms) in the normal condition, for example. When the AC zero cross points have disappeared, the input power abnormality judgment unit 682 may judge that DC voltage is inputted to the low-voltage power supply 610 or the input voltage is instantaneously interrupted.

When the AC zero cross points have disappeared (Yes in S40), the process proceeds to step S45. When the AC zero cross points have not disappeared (No in S40), the process proceeds to step S41.

In the step S41, the input power abnormality judgment unit 682 judges whether or not the frequency of the AC zero cross signal is abnormal. Here, the input power abnormality judgment unit 682 judges that the frequency of the AC zero cross signal is abnormal when a state in which the frequency is higher than a predetermined first threshold value and a state in which the frequency is lower than a predetermined second threshold value alternates. Incidentally, the first threshold value is desired to be higher than the second threshold value. Specifically, the first threshold value is desired to be greater than the periods of the AC zero cross signal in the normal condition, and the second threshold value is desired to be less than the periods of the AC zero cross signal in the normal condition.

When the frequency of the AC zero cross signal is abnormal (Yes in S41), the process proceeds to step S42. When the frequency of the AC zero cross signal is normal (No in S41), the process returns to the step S40 since normal AC power is inputted.

In the step S42, since voltage as superimposition of AC voltage and DC voltage is inputted to the low-voltage power supply 610, the input power abnormality judgment unit 682 guards the ACON signal so that the ACON signal to the phototriac 133 will not rise to the H level. Accordingly, the operation of the heater 22 is stopped.

Then, the input power abnormality judgment unit 682 makes the print control unit 681 stop the print operation and stores an error code of period abnormality caused by the superimposition of AC voltage and DC voltage in the nonvolatile storage unit 688 as error handling.

Subsequently, the input power abnormality judgment unit 682 commands the display control unit 184 to display a warning on the display unit 20 (S44). Here, the display unit 20 displays a message "Power supply input abnormality was detected. Print operation is stopped. Turn off power and call serviceperson.", for example. Then, the process returns to the step S40.

In the step S40, when the AC zero cross points are judged to have disappeared (Yes in S40), the process proceeds to the step S45.

In the step S45, the input power abnormality judgment unit 682 judges whether the heater 22 is on or not, based on a signal from the heater temperature control unit 683. When the heater 22 is on (Yes in S45), the process proceeds to step S46. When the heater 22 is off (No in S45), the process proceeds to step S53. Incidentally, the ACON signal from the heater temperature control unit 683 is at the H level when the heater 22 is on, and the ACON signal from the heater temperature control unit 683 is at the L level when the heater 22 is off.

In the step S46, the input power abnormality judgment unit 682 starts a timer for counting a predetermined time. Here, the predetermined time is assumed to be 80 ms. The time is determined as 80 ms as follows: When one cycle (two periods) of the AC zero cross signal in the normal condition is 20 ms, the time is determined as four cycles (20 ms×4=80 ms) including a one-cycle margin since the power of the image forming device 600 goes down in three cycles.

Subsequently, the input power abnormality judgment unit 682 judges whether or not an AC zero cross point is detected in the AC zero cross signal from the AC zero cross circuit 644 (S47). When an AC zero cross point is detected (Yes in S47), the process proceeds to step S48. When no AC zero cross point is detected (No in S47), the process proceeds to step S49.

In the step S48, the input power abnormality judgment unit 682 clears the timer started in the step S46 and ends the time count. In this case, which is the case where the input voltage is instantaneously interrupted, the process returns to the step S40.

In contrast, in the step S49, the input power abnormality judgment unit 682 judges whether or not the timer started in the step S46 has reached the predetermined time. When the timer has reached the predetermined time (Yes in S48), the process proceeds to step S50. When the timer has not reached the predetermined time (No in S48), the process returns to the step S47.

In the step S50, the input power abnormality judgment unit 682 blows the fuse C 645 by setting the fuse cut signal sent to the protection operation unit 629 at the H level.

Then, the input power abnormality judgment unit 682 makes the print control unit 681 stop the print operation and stores an error code of an error caused by the input of DC voltage in the nonvolatile storage unit 688 as error handling.

Subsequently, the input power abnormality judgment unit 682 commands the display control unit 184 to display a warning on the display unit 20 (S52). Here, the display unit 20 displays the message "Power supply input abnormality was detected. Print operation is stopped. Turn off power and call serviceperson.", for example.

In the step S45, when the heater 22 is not on (No in S45), the process proceeds to step S53.

In the step S53, the input power abnormality judgment unit 682 guards the ACON signal so that the ACON signal to the phototriac 133 will not rise to the H level.

Subsequently, the input power abnormality judgment unit 682 starts a timer for counting a predetermined time (S54). Also here, the predetermined time is assumed to be 80 ms.

Subsequently, the input power abnormality judgment unit 682 judges whether or not an AC zero cross point is detected in the AC zero cross signal from the AC zero cross circuit 644 (S55). When an AC zero cross point is detected (Yes in S55), the process proceeds to step S56. When no AC zero cross point is detected (No in S55), the process proceeds to step S57.

In the step S56, the input power abnormality judgment unit 682 clears the timer started in the step S54, ends the time count, and cancels the guard on the ACON signal that was set in the step S53. This case is the case where the input voltage is instantaneously interrupted, and the process returns to the step S40.

In contrast, in the step S57, the input power abnormality judgment unit 682 judges whether or not the timer started in the step S54 has reached the predetermined time. When the timer has reached the predetermined time (Yes in S57), the process proceeds to step S58. When the timer has not reached the predetermined time (No in S57), the process returns to the step S55.

In the step S58, the input power abnormality judgment unit 682 makes the print control unit 681 stop the print operation and stores the error code of the error caused by the input of DC voltage in the nonvolatile storage unit 688 as error handling.

Subsequently, the input power abnormality judgment unit 682 commands the display control unit 184 to display a warning on the display unit 20 (S59). Here, the display unit 20 displays the message "Power supply input abnormality was detected. Print operation is stopped. Turn off power and call serviceperson.", for example.

Next, a case where the input to the low-voltage power supply 610 is normal AC power, a case where DC power is superimposed on AC power and inputted to the low-voltage power supply 610, and a case where the input to the low-voltage power supply 610 is DC power will be described below by using the flowchart shown in FIG. 29.

First, the case where the input to the low-voltage power supply 610 is normal AC power will be described.

In the step S40, the input power abnormality judgment unit 682 makes the judgment on the disappearance of the AC zero cross points in the period time of the AC zero cross signal. In this case of the normal condition, the AC zero cross points are detected and the process proceeds to the step S41.

In the step S41, the input power abnormality judgment unit 682 judges the period abnormality. In this case where normal AC power is inputted, the process returns to the step S40.

Next, the case where DC power is superimposed on AC power and inputted to the low-voltage power supply 610 will be described.

First, in the step S40, the input power abnormality judgment unit 682 has detected AC zero cross points, and thus the process proceeds to the step S41.

In the step S41, the input power abnormality judgment unit 682 detects the period abnormality since DC power is superimposed on AC power. Thus, the process proceeds to the step S42.

In the step S42, the input power abnormality judgment unit 682 guards the ACON signal to prevent the heater 22 from being turned on and thereby stops the operation of the heater 22.

Subsequently, the input power abnormality judgment unit 682 makes the print control unit 681 stop the print operation and stores the error code of the period abnormality caused by the superimposition of AC voltage and DC voltage in the nonvolatile storage unit 688.

Subsequently, the input power abnormality judgment unit 682 has the warning displayed on the display unit 20.

Next, the case where the input to the low-voltage power supply 610 is DC power will be described. This description will be given also of the case where the input to the low-voltage power supply 610 is instantaneously interrupted.

First, in the step S40, no AC zero cross point is detected since DC power is inputted, and thus the process proceeds to the step S45.

In the step S45, the input power abnormality judgment unit 682 judges whether the heater 22 is on or not by monitoring the ACON signal from the heater temperature control unit 683. Here, the description will be given on the assumption that the heater 22 has already been turned on.

In such cases, the process proceeds to the step S46 and the input power abnormality judgment unit 682 starts the 80 ms timer. The time of the timer is set at 80 ms because it is necessary to distinguish between instantaneous power interruption and the input of DC power since the device power supply operates without going down when instantaneous power interruption continues for only one cycle.

In the case of instantaneous power interruption, an AC zero cross point is detected in the step S47, the timer is cleared in the step S48, and the process returns to the step S40.

In contrast, in the case where DC power is inputted, the AC zero cross signal is not detected in the step S47, and thus the process proceeds to the step S49 and the input power abnormality judgment unit 682 judges whether or not the 80 ms timer has expired.

When the 80 ms timer has expired, the process proceeds to the step S50 and the input power abnormality judgment unit 682 outputs the fuse cut signal (FC signal).

When the FC signal is inputted, the relay coil part 629a in the protection operation unit 629 operates and the fuse C 645 is blown.

Subsequently, the input power abnormality judgment unit 682 makes the print control unit 681 stop the print operation and stores the error code of the error caused by the input of DC voltage in the nonvolatile storage unit 688 as error handling.

Then, the input power abnormality judgment unit 682 has the warning displayed on the display unit 20.

When DC power is inputted and the heater 22 has not been turned on yet in the step S45 (No in S45), the input power abnormality judgment unit 682 in the step S53 guards the ACON signal. This is for preventing the ACON signal from turning on since turning off the triac 134 becomes impossible when DC power is inputted.

Then, in the step S54, the input power abnormality judgment unit 682 starts the 80 ms timer.

Subsequently, in the step S55, the input power abnormality judgment unit 682 performs the detection of AC zero cross points.

When the AC zero cross points had disappeared temporarily owing to instantaneous power interruption, the process proceeds to the step S56 and the input power abnormality judgment unit 682 clears the timer and cancels the guard on the ACON signal. Then, the process returns to the step S40.

When DC power is inputted to the low-voltage power supply 610, no AC zero cross point is detected in the step S55, and thus the process proceeds to the step S57.

In the step S57, when the timer has expired, the process proceeds to the step S58 and the input power abnormality judgment unit 682 makes the print control unit 681 stop the print operation and stores the error code of the error caused by the input of DC voltage in the nonvolatile storage unit 688 as error handling.

Subsequently, the input power abnormality judgment unit 682 has the warning displayed on the display unit 20. In this case, the fuse C 645 is not blown since the triac 134 has not turned on.

As above, the input power abnormality judgment unit 682 judges whether the input voltage is abnormal or not, and the fuse C 138a is blown by the protection operation unit 629 when the input voltage is judged to be abnormal by the input power abnormality judgment unit 682, the triac 134 has turned on the heater 22, and the state in which the input voltage is judged to be abnormal continues for a predetermined period.

As described above, according to the sixth embodiment, the fuse cut owing to instantaneous AC power interruption can be prevented since it is possible to distinguish between the instantaneous AC power interruption and the input of DC voltage by monitoring the AC zero cross signal and monitoring the time of no AC zero cross point input by using a program timer.

Further, by providing the fuse C 645 in the detachable fixation device 11, maintainability by the serviceperson in case of disconnection of the fuse C 645 owing to the input of DC voltage is improved.

Seventh Embodiment

As shown in FIG. 1, an image forming device 700 according to a seventh embodiment differs from the image forming device 100 according to the first embodiment in a low-voltage power supply 710 and a main control unit 780. The following description will be given mainly of the low-voltage power supply 710 and the main control unit 780.

Figure 30:
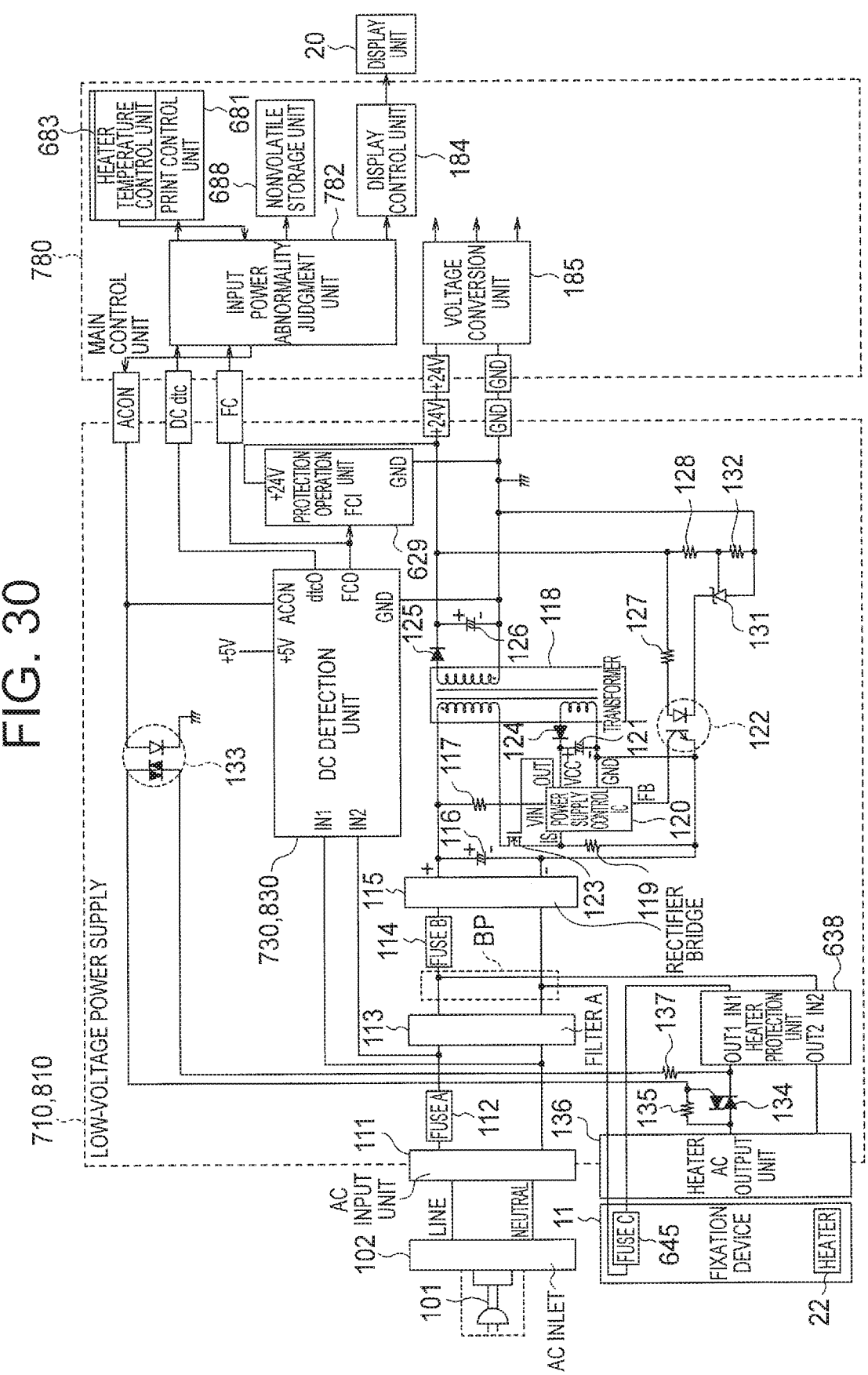
FIG. 30 is a block diagram showing the schematic configuration of a low-voltage power supply and a main control unit in image forming devices according to seventh and eighths embodiments.

FIG. 30 is a block diagram showing the schematic configuration of the low-voltage power supply 710 and the main control unit 780 in the image forming device 700 according to the seventh embodiment.

FIG. 30 shows parts relevant to features of the seventh embodiment, which are extracted from the low-voltage power supply 710 and the main control unit 780.

In the seventh embodiment, the AC zero cross circuit 644 in the sixth embodiment is replaced with a DC detection unit 730. Therefore, the operation of an input power abnormality judgment unit 782 in the main control unit 780 differs from that of the input power abnormality judgment unit 682 in the sixth embodiment.

Changes from the sixth embodiment will be mainly described below.

An IN1 pin of the DC detection unit 730 is connected to the AC input unit 111 and the filter A 113.

An IN2 pin of the DC detection unit 730 is connected to the fuse A 112 and the filter A 113.

A GND pin of the DC detection unit 730 is connected to the secondary side of the transformer 118, the − terminal of the electrolytic capacitor 126, the resistor 132, the anode of the variable shunt regulator 131, the GND pin of the protection operation unit 629, and a GND pin of the low-voltage power supply 710.

Although not illustrated, +5 V generated by a DC-DC converter from the +24 V supply power is inputted to a +5 V pin of the DC detection unit 730.

The output (dtc signal) from a dtcO pin of the DC detection unit 730 is inputted to the input power abnormality judgment unit 782 of the main control unit 780 via the DC dtc connector.

The output (FC signal) from an FCO pin of the DC detection unit 730 is inputted to the input power abnormality judgment unit 782 of the main control unit 780 via the FC dtc connector.

Further, the FCO pin of the DC detection unit 730 is connected to the FCI pin of the protection operation unit 629.

An ACON pin of the DC detection unit 730 receives the input of the ACON signal from the input power abnormality judgment unit 782 via the ACON connector.

Figure 31:
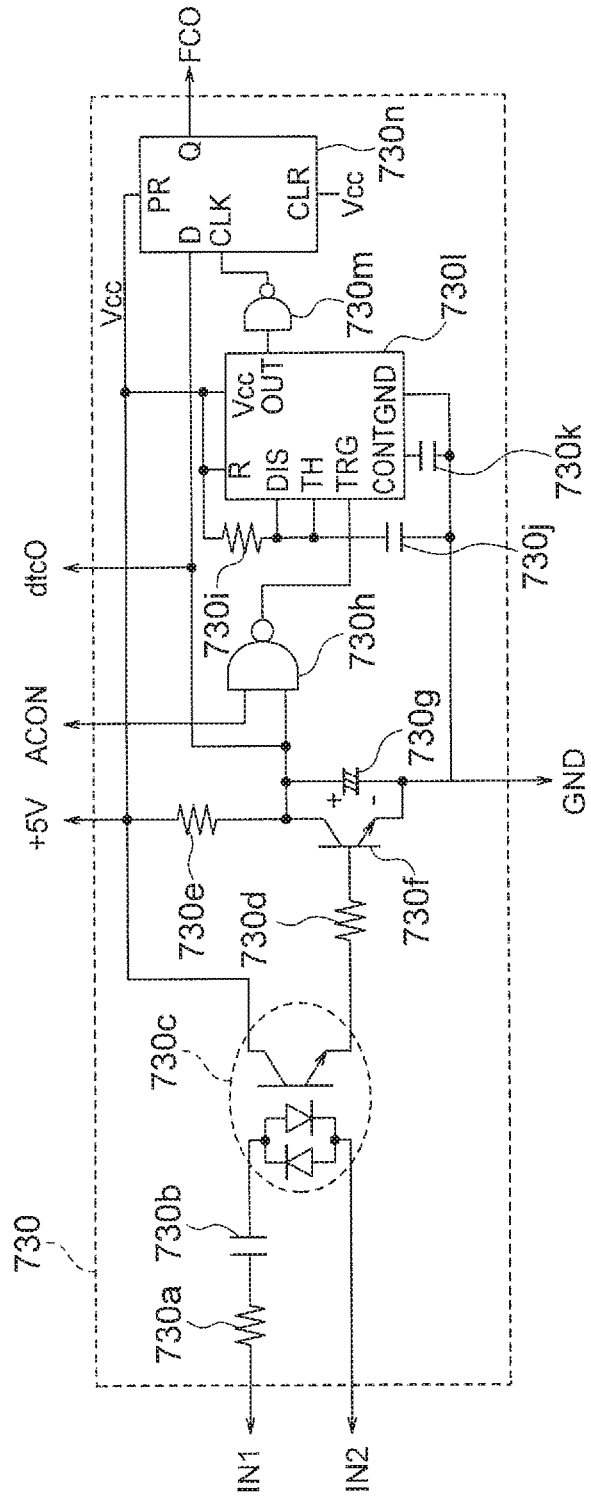
FIG. 31 is a circuit diagram showing an example of a DC detection unit in the seventh embodiment.

FIG. 31 is a circuit diagram showing an example of the DC detection unit 730 in the seventh embodiment.

The DC detection unit 730 includes a resistor 730a, a capacitor 730b, a photocoupler 730c, a resistor 730d, a resistor 730e, a transistor 730f, an electrolytic capacitor 730g, a NAND circuit 730h, a resistor 730i, a capacitor 730j, a capacitor 730k, a timer IC 730l, a NOT circuit 730m and a D-type flip-flop 730n.

As the timer IC 730l, NE555 is the original, and second source products are available from some companies.

The resistor 730a is connected to the IN1 pin of the DC detection unit 730.

Further, the resistor 730a is connected to the capacitor 730b.

The capacitor 730b is connected to the photocoupler 730c.

The photocoupler 730c is connected to the IN2 pin of the DC detection unit 730.

Further, the photocoupler 730c is connected to the +5 V pin of the DC detection unit 730, the resistor 730e, a Vcc pin of the timer IC 730l, and a PR pin and a CLR pin of the D-type flip-flop 730n. Although not illustrated, the photocoupler 730c is connected also to a Vcc pin of the NAND circuit 730h and a Vcc pin of the NOT circuit 730m.

Furthermore, the photocoupler 730c is connected to the resistor 730d.

The resistor 730d is connected to the base of the transistor 730f.

The emitter of the transistor 730f is connected to the GND pin of the DC detection unit 730.

The − terminal of the electrolytic capacitor 730g, the capacitor 730j, the capacitor 730k, and a GND pin of the timer IC 730l are also connected to the GND pin of the DC detection unit 730. Although not illustrated, a GND pin of the NAND circuit 730h, a GND pin of the NOT circuit 730m, and a GND pin of the D-type flip-flop 730n are also connected to the GND pin of the DC detection unit 730.

The collector of the transistor 730f is connected to the resistor 730e, the + terminal of the electrolytic capacitor 730g, a D pin of the D-type flip-flop 730n, the dtcO pin of the DC detection unit 730, and the input side of the NAND circuit 730h.

The input side of the NAND circuit 730h is connected to the ACON pin.

The output side of the NAND circuit 730h is connected to a TRG pin of the timer IC 730l.

A DIS pin and a TH pin of the timer IC 730l is connected to the resistor 730i and the capacitor 730j. The time of the timer (T=CR×1.1) is set by the resistor 730i and the capacitor 730j.

Further, the resistor 730i is connected to an R pin and the Vcc pin of the timer IC 730l.

The capacitor 730k is connected to a CONT pin of the timer IC 730l.

An OUT pin of the timer IC 730l is connected to the input side of the NOT circuit 730m.

The output side of the NOT circuit 730m is connected to a CLK pin of the D-type flip-flop 730n.

A Q pin of the D-type flip-flop 730n is connected to the FCO pin of the DC detection unit 730.

Figure 32A:
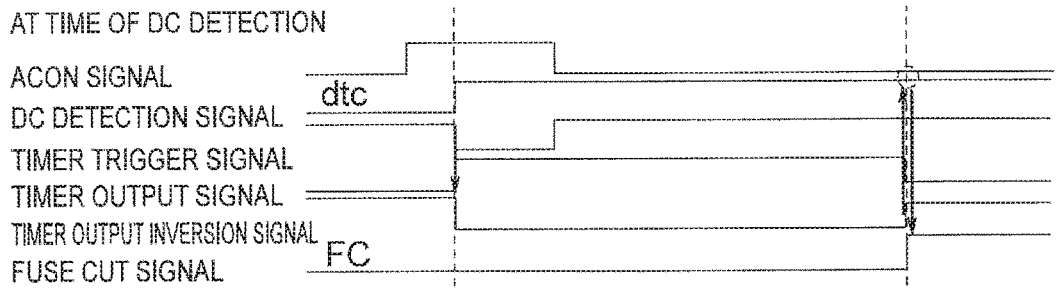
FIGS. 32A and 32B are time charts showing operations in the DC detection unit in the seventh embodiment.
Figure 32B:
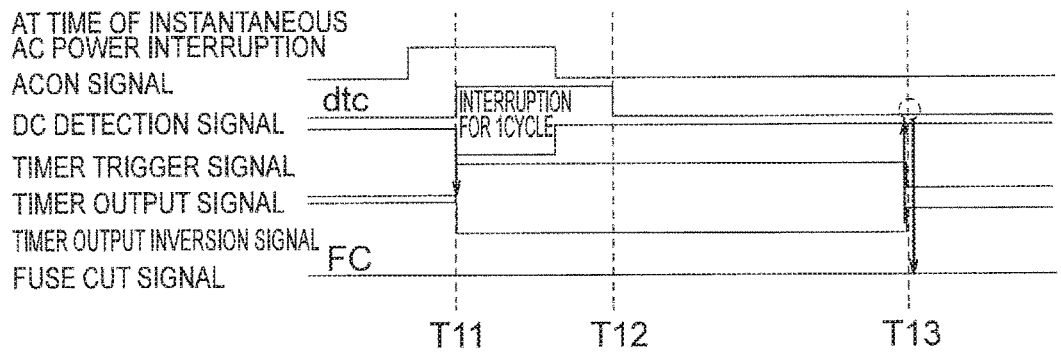

FIGS. 32A and 32B are time charts showing operations in the DC detection unit 730.

FIG. 32A shows an operation in the DC detection unit 730 when DC power is detected.

When the ACON signal is in the ON state and DC power is detected, the DC detection signal (dtc signal) turns to the H level and the output of the NAND circuit 730h turns to the L level, which works as a timer trigger for the timer IC 730l (T01).

When the output of the timer IC 730l turns to the H level, a timer output inversion signal as the output from the NOT circuit 730m turns to the L level.

The timer output inversion signal turns to the H level (T02) in the set time of the timer (e.g., 80 ms). At that time, the DC detection signal (dtc signal) is in the DC detection state (at the H level), and thus the CLK pin of the D-type flip-flop 730n turns from the L level to the H level, the H level of the fuse cut signal (FC signal) is outputted from the Q pin of the D-type flip-flop 730n, and the signal is outputted from the FCO pin as the H level signal.

FIG. 32B shows an operation in the DC detection unit 730 when AC power is instantaneously interrupted.

When the ACON signal is in the ON state and instantaneous interruption of AC power is detected, the DC detection signal (dtc signal) turns to the H level and the output of the NAND circuit 730h turns to the L level, which works as a timer trigger for the timer IC 730l (T11).

When the instantaneous interruption of AC power ends and AC power is inputted (T12), the dtc signal turns from the H level to the L level.

Accordingly, at the end of the timer (T13), the L level of the fuse cut signal (FC signal) is outputted from the Q pin of the D-type flip-flop 730n and a signal at the L level is outputted from the FCO pin.

Figure 33:
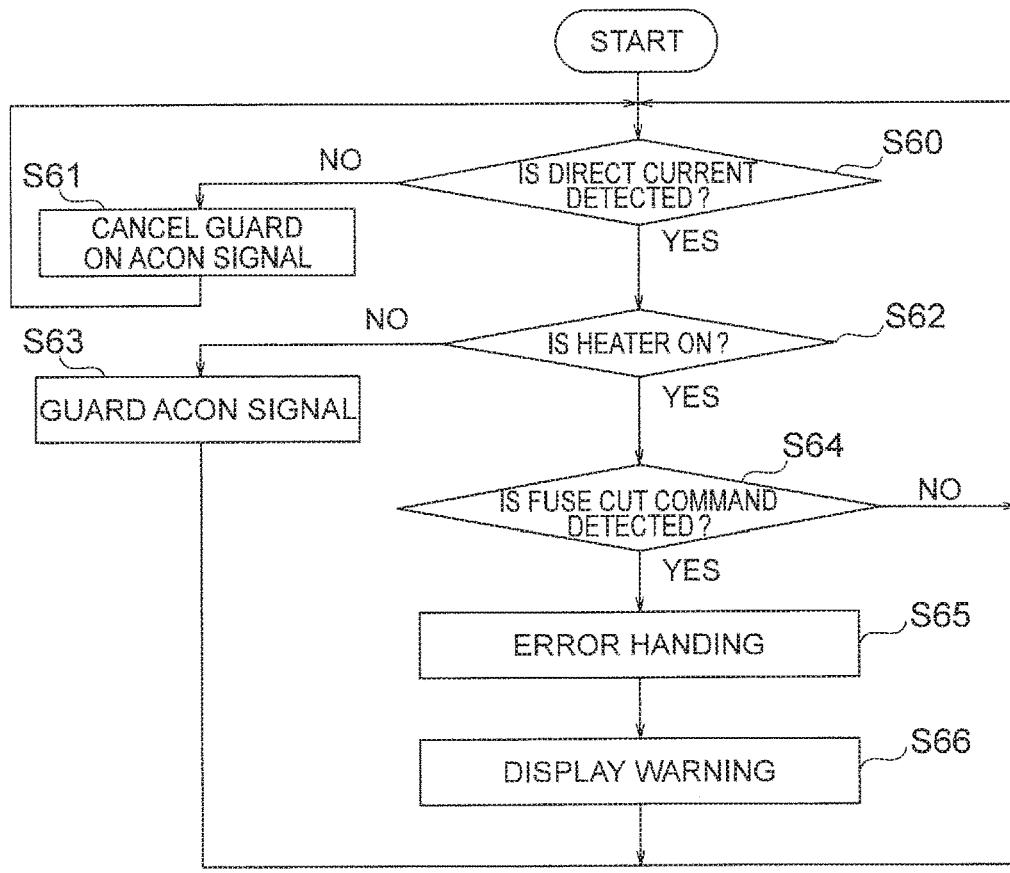
FIG. 33 is a flowchart showing the operation of an input power abnormality judgment unit in the seventh embodiment.

FIG. 33 is a flowchart showing the operation of the input power abnormality judgment unit 782.

First, the input power abnormality judgment unit 782 judges whether direct current is inputted or not, based on the DC detection signal (dtc signal) from the DC detection unit 730 (S60). When no direct current is inputted (No in S60), the process proceeds to step S61. When direct current is inputted (Yes in S60), the process proceeds to step S62.

In the step S61, the input power abnormality judgment unit 782 cancels the guard on the ACON signal. Then, the process returns to the step S60.

In the step S62, the input power abnormality judgment unit 782 judges whether the heater 22 is in the ON state or not, based on the ACON signal from the heater temperature control unit 683. When the heater 22 is not on (No in S62), the process proceeds to step S63. When the heater 22 is on (Yes in S62), the process proceeds to step S64.

In the step S63, the input power abnormality judgment unit 782 guards the ACON signal so as not to turn to the H level. This disables the heater temperature control unit 683 from turning the ACON signal to on (H level). Then, the process returns to the step S60.

In contrast, in the step S64, it is judged whether the H level of the fuse cut signal (FC signal) from the DC detection unit 730 is detected or not. When the H level of the fuse cut signal is detected (Yes in S64), the process proceeds to step S65. When the L level of the fuse cut signal is detected (NO in S64), the process returns to the step S60.

In the step S65, since the fuse C 645 is blown by the heater protection unit 638, the input power abnormality judgment unit 782 commands the print control unit 681 to stop the printing and stores the error code in the nonvolatile storage unit 688.

Subsequently, the input power abnormality judgment unit 782 commands the display control unit 184 to display a warning on the display unit 20. For example, the display unit 20 displays the message "Power supply input abnormality was detected. Print operation is stopped. Turn off power and call serviceperson.".

As described above, according to the seventh embodiment, the DC detection unit 730 is capable of distinguishing between instantaneous AC power interruption and DC voltage, and thus the disconnection of the fuse C 645 owing to instantaneous AC power interruption can be prevented.

Eighth Embodiment

As shown in FIG. 1, an image forming device 800 according to an eighth embodiment differs from the image forming device 100 according to the first embodiment in a low-voltage power supply 810 and the main control unit 780. The following description will be given mainly of the low-voltage power supply 810 and the main control unit 780.

FIG. 30 is a block diagram showing the schematic configuration of the low-voltage power supply 810 and the main control unit 780 in the image forming device 800 according to the eighth embodiment.

FIG. 30 shows parts relevant to features of the eighth embodiment, which are extracted form the low-voltage power supply 810 and the main control unit 780.

As shown in FIG. 30, the main control unit 780 in the eighth embodiment is the same as the main control unit 780 in the seventh embodiment.

Further, as shown in FIG. 30, the low-voltage power supply 810 in the eighth embodiment is the same as the low-voltage power supply 710 in the seventh embodiment except for a DC detection unit 830.

Figure 34:
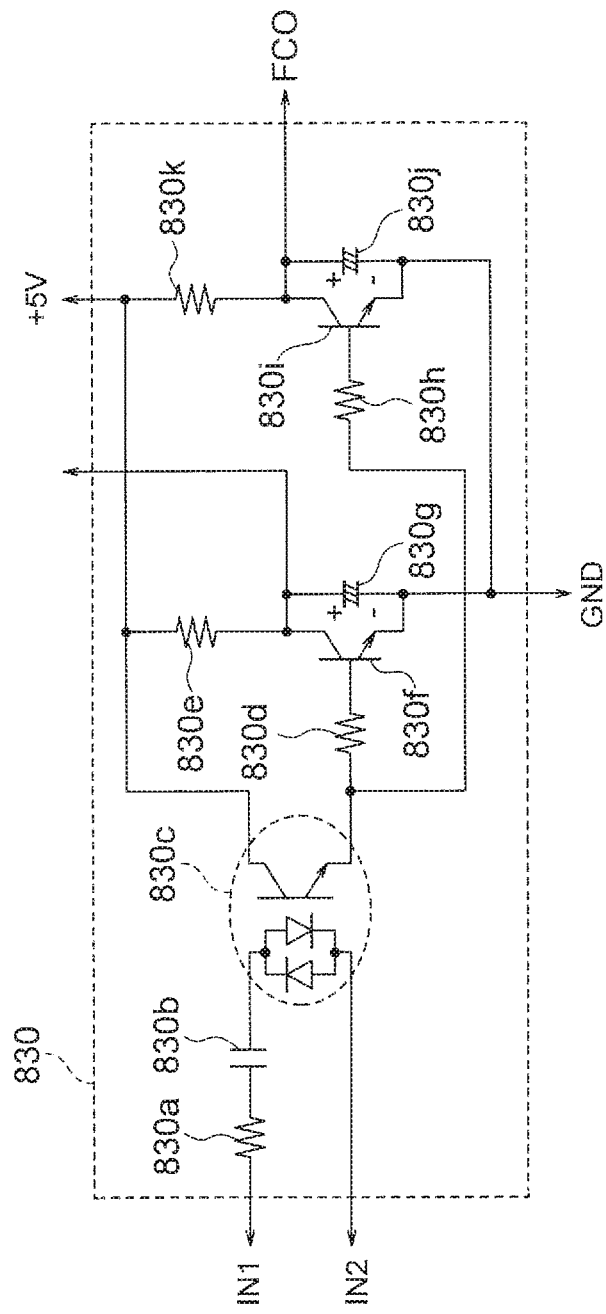
FIG. 34 is a circuit diagram showing an example of a DC detection unit in an eighth embodiment.

FIG. 34 is a circuit diagram showing an example of the DC detection unit 830 in the eighth embodiment.

The DC detection unit 830 includes a resistor 830a, a capacitor 830b, a photocoupler 830c, a resistor 830d, a resistor 830e, a transistor 830f, an electrolytic capacitor 830g, a resistor 830h, a transistor 830i, an electrolytic capacitor 830j and a resistor 830k.

The resistor 830a is connected to an IN1 pin of the DC detection unit 830.

Further, the resistor 830a is connected to the capacitor 830b.

The capacitor 830b is connected to the photocoupler 830c.

The photocoupler 830c is connected to an IN2 pin of the DC detection unit 830.

Further, the photocoupler 830c is connected to a +5 V pin of the DC detection unit 830, the resistor 830e and the resistor 830k.

Furthermore, the photocoupler 830c is connected to the resistor 830d and the resistor 830h.

The resistor 830d is connected to the base of the transistor 830f.

The resistor 830h is connected to the base of the transistor 830i.

The emitters of the transistor 830f and the transistor 830i are connected to the − terminals of the electrolytic capacitor 830g and the electrolytic capacitor 830j, and a GND pin of the DC detection unit 830.

Further, the collector of the transistor 830f is connected to the resistor 830e, the + terminal of the electrolytic capacitor 830g and a dtcO pin of the DC detection unit 830.

The collector of the transistor 830i is connected to the resistor 830k, the + terminal of the electrolytic capacitor 830j and an FCO pin of the DC detection unit 830.

Figure 35:
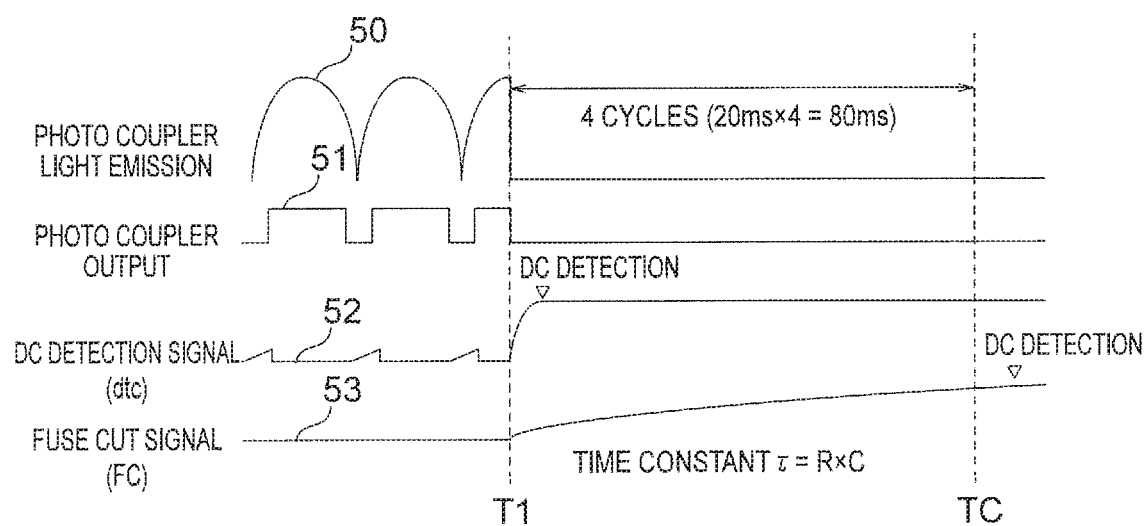
FIG. 35 is a schematic diagram for explaining operational waveforms of the DC detection unit in the eighth embodiment.

FIG. 35 is a schematic diagram for explaining operational waveforms of the DC detection unit 830.

The reference character 50 indicates a light emission waveform of the photocoupler 830c.

The reference character 51 indicates an output waveform of the photocoupler 830c.

The reference character 52 indicates the collector output of the transistor 830f (DC detection signal: dtc signal). The electrolytic capacitor 830g is connected to the transistor 830f in order to suppress fluctuation occurring when the output of the photocoupler 830c indicated by the reference character 51 is off.

The reference character 53 indicates the waveform of the fuse cut signal (FC signal).

When DC power is inputted after the time T1, a DC component is cut off since the DC detection unit 830 is provided with the capacitor 830b, and the photocoupler 830c does not emit light as indicated by the reference character 50. Accordingly, the output from the photocoupler 830c turns to the L level as indicated by the reference character 51.

At that time, the DC detection signal (dtc signal) rises immediately as indicated by the reference character 52 and thereby indicates that DC power is detected.

In contrast, the fuse cut signal (FC signal) indicated by the reference character 53 rises in a time adjusted to 80 ms owing to the time constant ($\tau = R \times C$) determined by the resistor 830k and the electrolytic capacitor 830j.

As described above, according to the eighth embodiment, it is possible to distinguish between instantaneous AC power interruption and the input of DC voltage by providing the DC detection unit 830 with a delay circuit employing the CR time constant. Accordingly, the disconnection of the fuse C 645 owing to instantaneous AC power interruption can be prevented.

Further, according to the sixth embodiment, in cases where a halogen lamp is used for the heater 22 of the fixation device 11, an AC zero cross circuit is generally used for phase control based on the AC zero cross signal as a countermeasure against flicker or the like, and thus, the AC zero cross signal can be shared.

Furthermore, in cases where the heater 22 employs quick fixation by use of a sheet-like heater or the like, control such as the flicker control is unnecessary, and thus the DC detection unit 730 or 830 in the seventh or eighth embodiment can be used instead of the AC zero cross circuit.

In the sixth to eighth embodiments described above, it is permissible if the fuse C 645 and the heater protection unit 638 is provided on the heater 22's side of the branch point BP; positional relationship with the triac 134 is not limited to the positional relationship shown in FIG. 23 or FIG. 30. The arrangement of the fuse C 645, the heater protection unit 638 and the triac 134 may be arbitrarily selected as long as the fuse C 645, the heater protection unit 638 and the triac 134 are provided on the heater 22's side of the branch point BP.

The image forming devices 100 to 800 described above are applicable to printers, facsimile machines, multifunction printers, and so forth.

DESCRIPTION OF REFERENCE CHARACTERS

100, 200, 300, 400, 500, 600, 700, 800: image forming device, 110, 210, 310, 410, 510, 610, 710, 810: low-voltage power supply, 129, 229, 329, 429, 529, 629: protection operation unit, 130, 230, 530, 730, 830: DC detection unit, 134: triac, 138, 638: heater protection unit, 138a: fuse C, 241: heater operation unit, 442: voltage detection unit, 644: AC zero cross circuit, 645: fuse C, 180, 280, 380, 480, 580, 680, 780: main control unit, 181, 681: print control unit, 182, 582: input power abnormality judgment unit, 183, 383, 683: heater temperature control unit, 184: display control unit, 286: heater temperature detection unit, 387: temperature abnormality detection unit, 688: nonvolatile storage unit, 20: display unit, 22: heater

What is claimed is:

1. An image forming device that forms an image on a medium, comprising:
    a heater that heats the medium;
    a control unit that controls the heater;
    a first path that receives an input voltage from an external power supply, the input voltage being converted into a desired voltage to be supplied to the control unit;
    a second path that branches off from the first path and supplies the input voltage to the heater;
    a control element that is connected to the second path and controls ON/OFF switching of the heater according to control from the control unit;
    an input abnormality detection unit that detects abnormality in the input voltage when the input voltage is DC voltage in which no AC zero cross point is detected; and
    a disconnection unit that disconnects the second path when the abnormality is detected.

2. The image forming device according to claim 1, wherein the disconnection unit disconnects the second path when the abnormality is detected and the control element is in an operating state in which the control element is capable of turning on the heater.

3. The image forming device according to claim 2, wherein when the abnormality is detected and the control element is in a non-operating state in which the control element is incapable of turning on the heater, the control unit does not turn the non-operating state into the operating state and the disconnection unit does not disconnect the second path.

4. An image forming device that forms an image on a medium, comprising:
    a heater that heats the medium;
    a control unit that controls the heater;
    a first path that receives an input voltage from an external power supply, the input voltage being converted into a desired voltage to be supplied to the control unit;
    a second path that branches off from the first path and supplies the input voltage to the heater:
    a control element that is connected to the second path and controls ON/OFF switching of the heater according to control from the control unit;
    an input abnormality detection unit that detects abnormality in the input voltage; and
    a disconnection unit that disconnects the second path when the abnormality is detected and the control element has turned on the heater.

5. The image forming device according to claim 4, wherein when the abnormality is detected and the control element has turned off the heater, the control unit does not allow the control element to turn on the heater and the disconnection unit does not disconnect the second path.

6. The image forming device according to claim 1, further comprising
    a heater temperature detection unit that detects temperature of the heater,
    wherein the disconnection unit disconnects the second path when the abnormality is detected and the temperature exceeds a predetermined threshold value.

7. The image forming device according to claim 1, further comprising
    a voltage detection unit that detects whether or not the input voltage is inputted to the first path,
    wherein the disconnection unit disconnects the second path when the abnormality is detected, the control element has turned on the heater, and the input voltage is inputted to the first path.

8. The image forming device according to claim 1, further comprising an output abnormality detection unit that detects abnormality in the input voltage in the second path,
    wherein the disconnection unit disconnects the second path when the abnormality is detected.

9. An image forming device that forms an image on a medium, comprising:
    a heater that heats the medium;
    a control unit that controls the heater;

a first path that receives an input voltage from an external power supply, the input voltage being converted into a desired voltage to be supplied to the control unit;

a second path that branches off from the first path and supplies the input voltage to the heater;

a control element that is connected to the second path and controls ON/OFF switching of the heater according to control from the control unit;

an input abnormality detection unit that detects abnormality in the input voltage in the first path;

an output abnormality detection unit that detects abnormality in the input voltage in the second path; and a disconnection unit that disconnects the second path when the abnormality is detected by both the input abnormality detection unit and the output abnormality detection unit.

10. The image forming device according to claim 1, wherein the abnormality is detected when the input voltage is DC voltage in which no AC zero cross point is detected for a predetermined period, the predetermined period being longer than one period of an AC zero cross signal in a normal condition.

11. The image forming device according to claim 1, wherein:
the control unit judges whether or not the input voltage is abnormal, and
the disconnection unit disconnects the second path when the input voltage is judged to be abnormal, the control element has turned on the heater, and the state in which the input voltage is judged to be abnormal continues for a predetermined period.

12. The image forming device according to claim 11, wherein the input voltage is judged to be abnormal when the input voltage is DC voltage.

13. The image forming device according to claim 11, wherein the input voltage is judged to be abnormal when the input voltage is DC voltage for a predetermined period.

14. The image forming device according to claim 12, further comprising an AC zero cross detection unit that detects an AC zero cross point of the input voltage,
wherein the control unit judges that the input voltage is abnormal when the AC zero cross point is not detected.

15. The image forming device according to claim 1, wherein the control element is a triac.

16. The image forming device according to claim 10, wherein
an AC power is supplied to the image forming device, and
the predetermined period is longer than a period of an instantaneous power interruption in which the image forming device operates without going down even if the AC power becomes 0V.

17. The image forming device according to claim 1, wherein the input abnormality detection unit includes
a resistor that is connected to the first path,
a first capacitor that is connected to the resistor in series,
a photocoupler that is connected to the first capacitor in series and that stops a signal when the DC voltage in which no AC zero cross point is detected is input to the photocoupler, and
a second capacitor into which voltage controlled by the signal output from the photocoupler is input.

* * * * *